US010967519B2

(12) United States Patent
Fisher et al.

(10) Patent No.: US 10,967,519 B2
(45) Date of Patent: Apr. 6, 2021

(54) SYSTEMS AND METHODS FOR AUTOMATIC DETECTION OF SPILLS

(71) Applicant: Brain Corporation, San Diego, CA (US)

(72) Inventors: Dimitry Fisher, San Diego, CA (US); Cody Griffin, San Diego, CA (US); Micah Richert, San Diego, CA (US); Filip Piekniewski, San Diego, CA (US); Eugene Izhikevich, San Diego, CA (US); Jayram Moorkanikara Nageswaran, San Diego, CA (US); John Black, San Diego, CA (US)

(73) Assignee: Brain Corporation, San Diego, CA (US)

( * ) Notice: Subject to any disclaimer, the term of this patent is extended or adjusted under 35 U.S.C. 154(b) by 0 days.

(21) Appl. No.: 16/582,302

(22) Filed: Sep. 25, 2019

(65) Prior Publication Data

US 2020/0086494 A1    Mar. 19, 2020

Related U.S. Application Data

(63) Continuation of application No. 15/997,397, filed on Jun. 4, 2018, now Pat. No. 10,464,213, which is a (Continued)

(51) Int. Cl.
*G06K 9/00* (2006.01)
*B25J 9/16* (2006.01)
(Continued)

(52) U.S. Cl.
CPC .......... *B25J 9/1697* (2013.01); *G05D 1/0016* (2013.01); *G05D 1/0246* (2013.01); (Continued)

(58) Field of Classification Search
CPC . B25J 9/1697; G06K 9/00671; G06K 9/4652; G06K 9/4661; G06T 7/0079; H04N 5/33; G01C 21/3415
See application file for complete search history.

(56) References Cited

U.S. PATENT DOCUMENTS 9,987,752 B2 *   6/2018  Fisher ................ G06K 9/00671
10,464,213 B2 *  11/2019  Fisher ....................... G06T 7/11
(Continued)

FOREIGN PATENT DOCUMENTS

EP      2871610 A1    5/2015

OTHER PUBLICATIONS

Supplementary European Search Report dated Jan. 13, 2020 for EP Patent Application No. 17811081.3.

*Primary Examiner* — Duy M Dang

(74) *Attorney, Agent, or Firm* — Reed Smith LLP; Sidharth Kapoor

(57) ABSTRACT

Systems and methods for automatic detection of spills are disclosed. In some exemplary implementations, a robot can have a spill detector comprising at least one optical imaging device configured to capture at least one image of a scene containing a spill while the robot moves between locations. The robot can process the at least one image by segmentation. Once the spill has been identified, the robot can then generate an alert indicative at least in part of a recognition of the spill.

16 Claims, 11 Drawing Sheets

Related U.S. Application Data continuation of application No. 15/179,851, filed on Jun. 10, 2016, now Pat. No. 9,987,752.

(51) Int. Cl.
  *G06K 9/46* (2006.01)
  *G06T 7/11* (2017.01)
  *H04N 5/33* (2006.01)
  *G05D 1/00* (2006.01)
  *G08B 21/20* (2006.01)
  *G05D 1/02* (2020.01)

(52) U.S. Cl.
  CPC ....... *G06K 9/00671* (2013.01); *G06K 9/4652* (2013.01); *G06K 9/4661* (2013.01); *G06T 7/11* (2017.01); *G08B 21/20* (2013.01); *H04N 5/33* (2013.01); *G05D 2201/0203* (2013.01); *G06K 9/00771* (2013.01); *G06T 2207/10024* (2013.01); *G06T 2207/10048* (2013.01)

(56) References Cited

U.S. PATENT DOCUMENTS

| | | | |
|---|---|---|---|
| 2003/0063006 A1 | 4/2003 | Gutta et al. | |
| 2013/0325325 A1* | 12/2013 | Djugash | G08G 1/0141 701/425 |
| 2015/0234387 A1 | 8/2015 | Mullan et al. | |

\* cited by examiner

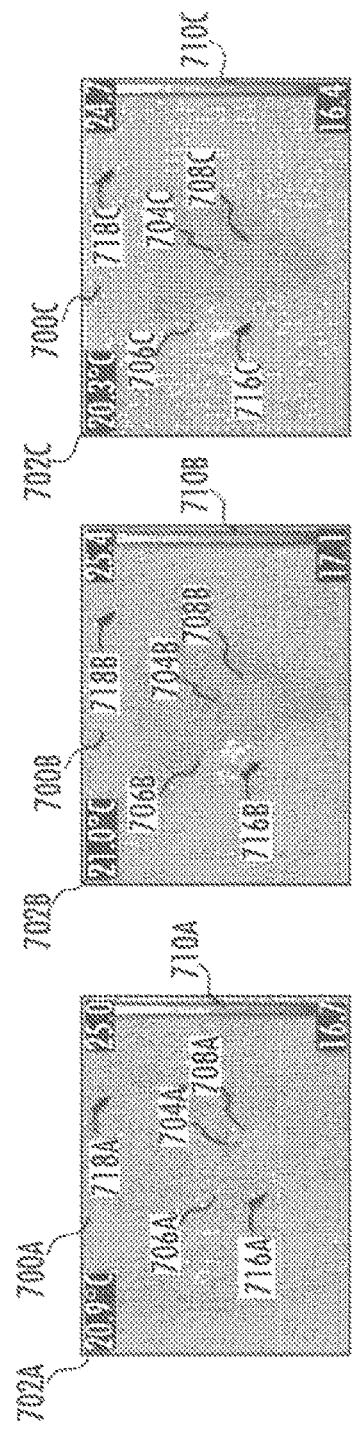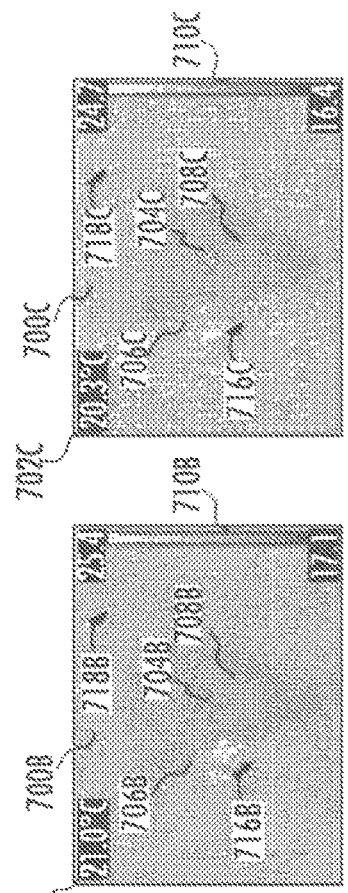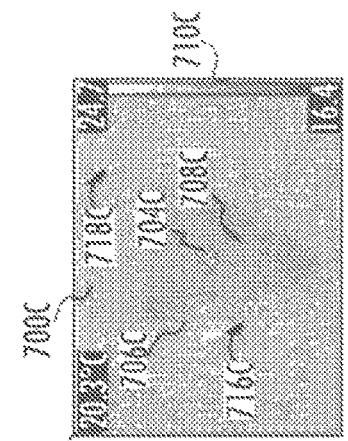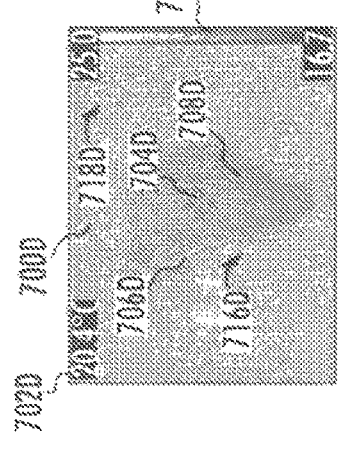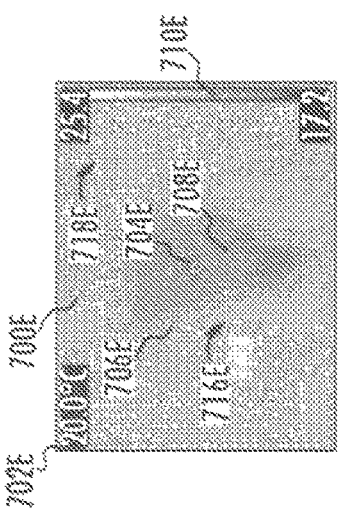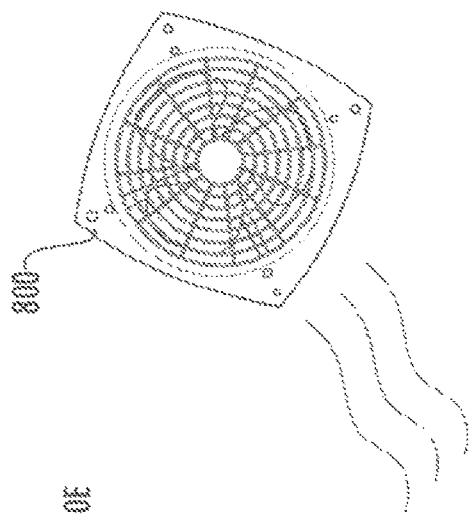

SYSTEMS AND METHODS FOR AUTOMATIC DETECTION OF SPILLS

PRIORITY

This application is a continuation of U.S. patent application Ser. No. 15/997,397 filed Jun. 4, 2018, now U.S. Pat. No. 10,464,213, which is a continuation of U.S. patent application Ser. No. 15/179,851, filed Jun. 10, 2016, now U.S. Pat. No. 9,987,752, the contents of each of which are being incorporated herein by reference in their entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems and methods for automatic detection of spills.

Background

Presently, spillage of water and other chemicals can pose injury risks for nearby people. For example, people can slip on spills and injure their arms, legs, or other body parts. Spills can be especially dangerous in store and warehouse environments where there can be high foot traffic. Indeed, every year, slip-and-fall injuries send millions of people to the hospital with an annual direct cost in the billions of dollars. Moreover, these slip-and-fall injuries also result in deaths and millions of lost work days a year. Also, spillage of water and other chemicals can also cause damage to surrounding surfaces and items when they spread, and can ruin clothing and other items. For example, store items can be damaged and/or carpet destroyed by spills.

In some cases, such spillage can occur when vessels containing those liquids are knocked over, such as by a customer or employee. Spills can also occur during cleanings that involve liquids. For example, floor scrubbers use water and/or other chemicals to clean floors. In some cases, the water and/or other chemicals can leak or otherwise be left on floors, creating hazards and potentially damaging surfaces and items.

Currently, methods of detecting spills often rely on human inspection, where persons who happen to come across those spills clean up (e.g., mop) those spills or bring the spill to the attention of the proper person. Not only can these methods be inefficient, but many spills can go undetected for substantial amounts of time. Accordingly, there is a need for improved systems and methods for detection of spills.

SUMMARY

The foregoing needs are satisfied by the present disclosure, which provides for, inter alfa, apparatus and methods for spill detection. Example implementations described herein have innovative features, no single one of which is indispensable or solely responsible for their desirable attributes. Without limiting the scope of the claims, some of the advantageous features will now be summarized.

In some implementations a spill detector is disclosed. In some cases, the spill detector can be coupled to a robot. Where the spill detector is attached to the robot, the spill detector can detect spills as the robot moves. Whether the spill detector is attached to the robot or not, when spills are detected, the spill detector can perform actions, such as stopping the robot (and/or a system of the robot), alerting a user, and/or ignoring the spill.

In a first aspect, a robot is disclosed. In one exemplary implementation, the robot includes: an actuator configured to move the robot between locations; a spill detector comprising at least one optical imaging device configured to capture at least one image of a scene containing a spill while the robot moves between locations; and a processor configured to identify the spill in the at least one image and generate an alert indicative in part of a recognition of the spill.

In one variant, the optical imaging device is an infrared camera and the at least one image is a thermal image.

In another variant, the robot further includes a temperature adjuster configured to change the temperature of the scene containing the spill. In another variant, the temperature adjuster is at least one of an exhaust and a fan.

In another variant, the processor of the robot is further configured to determine a confidence in the identification of the spill. In another variant, the confidence is determined based at least in part on Bayesian statistical models.

In another variant, the robot further comprises a sensor configured to detect at least one of reflectance properties, emission properties, electrical properties, noises, and friction of the scene. In another variant, the confidence is based at least in part on information from the sensor and the at least one image.

In another variant, the processor is further configured to generate a color image having colors based at least in part on thermal values of a segment of the at least one image, and determine if the colors are indicative at least in part of the spill.

In another variant, the robot further comprises a floor cleaning system.

In a second aspect, a method for detecting spills is disclosed. In one exemplary implementation, the method includes: generating a first image of a first scene at a first location that contains a spill; generating a second image of a second scene at a second location that contains no spills; segmenting the first image to detect the spill from at least thermal values in a segment of the first image; identifying the spill; and generating an alert indicative at least in part of the identification of the spill.

In one variant, the method further includes adjusting the temperature of the first scene while generating the first image.

In another variant, the method further includes determining a confidence in the identified spill, wherein the generated alert is further indicative of the confidence.

In another variant, the method further includes sensing at least one of reflectance properties, emission properties, electrical properties, noises, and friction of the first scene.

In another variant, the method further includes determining a confidence in the identified spill based at least in part on the segmentation of the first image and the sensed at least one of reflectance properties, emission properties, electrical properties, noises, and friction of the first scene, wherein the generated alert is further indicative of the confidence.

In another variant, the method further includes receiving an action command in response to the generated alert and performing an action in response to the action command.

In a third aspect, a non-transitory computer-readable storage medium is disclosed. In one exemplary implementation, the non-transitory computer-readable storage medium has a plurality of instructions stored thereon, the instructions being executable by a processing apparatus to operate a spill detector, the instructions configured to, when executed by the processing apparatus, cause the processing apparatus to: generate a first image of a first scene at a first location that contains a spill; generate a second image of a second scene at a second location that contains no spills; segment the first image to detect the spill from at least thermal values in a segment of the first image; identify the spill; and generate an alert indicative at least in part of the identification of the spill.

In one variant, the instructions further cause the processing apparatus to adjust the temperature of the first scene while generating the first image.

In another variant, the instructions further cause the processing apparatus to determine a confidence in the identified spill, wherein the generated alert is further indicative of the confidence.

In another variant, the instructions further cause the processing apparatus to sense at least one of reflectance properties, emission properties, electrical properties, noises, and friction of the first scene.

In another variant, the instructions further cause the processing apparatus to determine a confidence in the identified spill based at least in part on the segmentation of the first image and the sensed at least one of reflectance properties, emission properties, electrical properties, noises, and friction of the first scene, wherein the generated alert is further indicative of the confidence.

In another variant, the instructions further cause the processing apparatus to receive an action command in response to the generated alert and perform an action in response to the action command.

In a fourth aspect, a spill detector is disclosed. In one exemplary implementation, the spill detector includes: one or more sensors configured to generate data indicative of a spill when a spill is present; and a processor configured to determine a confidence that a spill has been detected from the generated data.

In one variant, the one or more sensors include a camera. In another variant, the one or more sensors include at least one of a microphone, a light meter, a dynamometer, a fluorescence detector, a fluorescence imager, a capacitance meter, a voltmeter, a multimeter, an oscilloscope, an ohmmeter, and an ammeter.

In another variant, the processor is further configured to generate a command based at least in part on the determined confidence. In one variant, the command is a stop command. In one variant, the command instructs the spill detector to send a request to a user interface for further instructions.

In a fifth aspect, a robot that performs an action in response to a spill is disclosed. In one exemplary implementation, the robot includes an actuator configured to move the robot between locations; a spill detector comprising at least one optical imaging device configured to capture at least one image of a scene containing a spill while the robot moves between locations; and a processor configured to generate an action command based at least in part on the at least one image.

In one variant, the robot further includes a temperature adjuster configured to changes the temperature of the scene containing the spill.

In another variant, the action command is a stop command that stops the robot from moving between locations.

In a sixth aspect, a system for spill detection is disclosed. In one exemplary implementation, the system includes a spill detector communicatively coupled to a server. The server is communicatively coupled to a robot and one or more access points.

In a seventh aspect, a control center is disclosed. In one exemplary implementation, the control center is communicatively coupled to a spill detector through a server. The control center remotely sends commands to a robot based at least in part on spills detected by the spill detector.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIGS. 7A-7E are exemplary thermal images taken of a spill by a spill detector that includes an infrared camera in accordance to some implementations of the present disclosure.

FIG. 8 is a side elevation view of an exemplary fan configured to blow air onto a spill in accordance with some implementations of the present disclosure.

Figure 1:
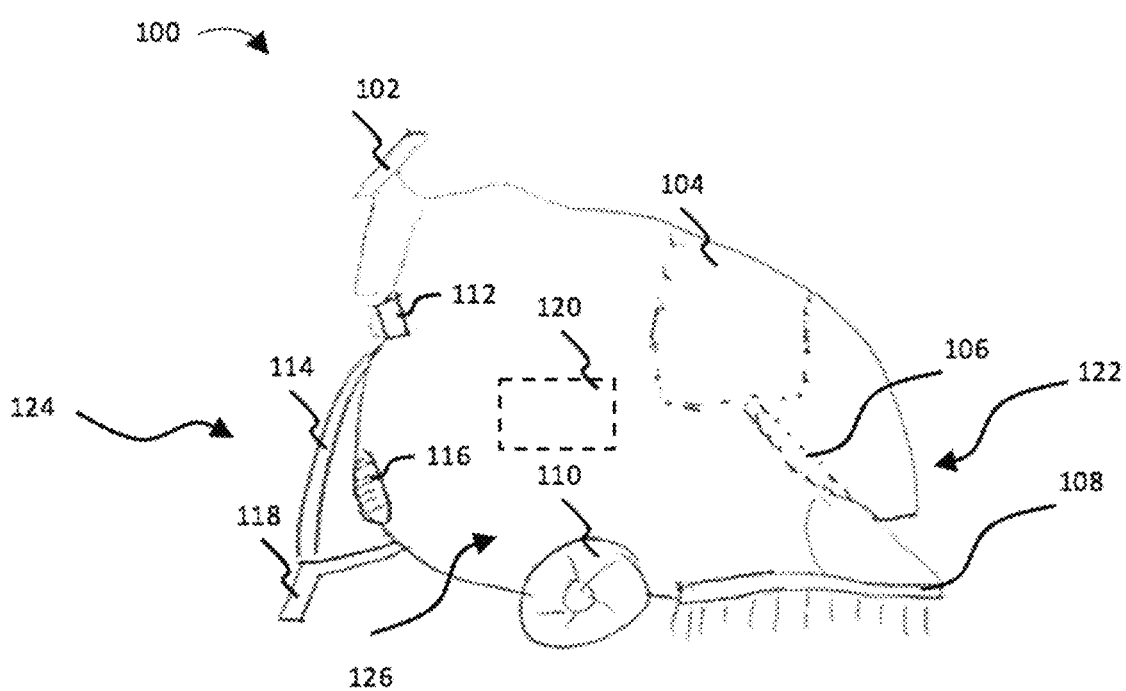
FIG. 1 is a side elevation view of an example robot having a spill detector in accordance with some implementations of the present disclosure.

All Figures disclosed herein are © Copyright 2019 Brain Corporation. All rights reserved.

DETAILED DESCRIPTION

I. Overview

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of, or combined with, any other aspect of the disclosure. For example, an apparatus can be implemented or a method can be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein can be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for improved systems and methods for detection of spills. As used herein, a robot can include mechanical or virtual entities configured to carry out complex series of actions automatically. In some cases, robots can be machines that are guided by computer programs or electronic circuitry. In some cases, robots can include electro-mechanical components that are configured for navigation, where the robot can move from one location to another. Such navigating robots can include autonomous cars, floor cleaners, rovers, drones, carts, and the like.

As referred to herein, floor cleaners can include floor cleaners that are manually controlled (e.g., driven or remote control) and/or autonomous (e.g., using little to no user control). For example, floor cleaners can include floor scrubbers that a janitor, custodian, or other person operates and/or robotic floor scrubbers that autonomously navigate and/or clean an environment.

Detailed descriptions of the various implementations and variants of the system and methods of the disclosure are now provided. While many examples discussed herein are in the context of robotic floor cleaners, it will be appreciated that the described systems and methods contained herein can be used in other robots. Myriad other example implementations or uses for the technology described herein would be readily envisaged by those having ordinary skill in the art, given the contents of the present disclosure.

Advantageously, the systems and methods of this disclosure at least: (i) provide for automatic detection of spills; (ii) enable robotic detection of spills; (iii) reduce or eliminate injuries and property damage through early spill detection; (iv) enable automatic robotic cleaning by detecting and cleaning spills; (v) reduce or eliminate false positive and/or false negative detection of spills; and (vi) enhance the ability of spills to be detected by off-the-shelf components such as cameras. Other advantages are readily discernable by one having ordinary skill given the contents of the present disclosure.

As used herein, spills (and/or spillage) can include liquids and/or partial liquids, such as water and/or other chemicals. Such other chemicals include any type of chemical that may spill on a floor in a particular environment. For example, in a grocery store, chemicals can include aqueous solutions, honey, milk, mustard, ketchup, beverages, bodily fluids, oil, butter, ice, candy, cleaners (e.g., cleaning fluid, floor wax, disinfectants, etc.), and/or other chemicals. In a warehouse, chemicals can include aqueous solutions, grease, oil, cleaners (e.g., cleaning fluid, floor wax, disinfectants, etc.), industrial waste, coolant, etc.

The spills can be on a surface, such as a floor. Surfaces can include any known surfaces, including those used as flooring in stores or warehouses. For example, surfaces can comprise wood (e.g., engineered, synthetic, hardwood, etc.), bamboo, vinyl, concrete, ceramic tile, linoleum, porcelain tile, laminate, cork, stone, aluminum, metals, steel, epoxy, and other materials. In many cases, surfaces can include materials in a solid state.

Accordingly, because of their different chemical make-ups and different physical states, the spills and surfaces can have different properties/characteristics as compared to each other. Some examples will be briefly mentioned here, but later discussed in more detail in sections II and III of this disclosure.

By way of illustration of some of the differences in properties/characteristics, the spills can have different electrical properties, such as conductance, impedance, and capacitance, from the surface. The spills can also have different coefficients of friction than the surface.

The spills can also have different thermal properties as well. For example, many spills can be subject to physical phenomenon such as evaporative cooling (e.g., of volatile liquids), adiabatic expansion, Joule Thomson effects, and/or other thermodynamic effects of liquids, gases, or liquid-gas mixtures. As a result, many spills (e.g., water, aqueous solutions, oil, solvents, fuels, etc.) may be cooler than the surfaces on which they reside due to the aforementioned physical phenomenon. The temperature of the spill may also differ from that of the floor because the substance spilled may be originally at a different temperature, intentionally (e.g., to help detect the spill and/or to prevent spoilage) or unintentionally. For example, a person having ordinary skill in the art should appreciate that the thermal image of a spill of a warm or hot cleaning fluid would look quite different from a spill whose cleaning fluid is originally at room temperature or below room temperature.

Spills can also have different reflectance and/or emission of light. For example, some spills may be more reflective than their corresponding surfaces. As a result, incident light (e.g., light from fixtures, sunlight, or any other light source) may reflect more from the spills than the surfaces. Spills of different temperature can also emit different amounts of heat. Spills can also have different ultraviolet-induced florescence, where some spills can have unique florescent properties when exposed to ultraviolet ("UV") radiation and/or other radiation. Spill may have different reflectance and/or emission properties. For example, at or substantially near Brewster's angle, reflected light can be at least partially polarized.

Despite having these different properties, detection of spills can still have challenges. For example, it may be desirable for a mobile robot, such as a robot that can navigate an environment, to locate and/or treat spills. However, some spills take time before their thermal properties cause them to change temperature from the surface on which they are deposited. Accordingly, where the robot relies at least in part on thermal differences, the robot may miss a spill if it passes it too soon.

As another example, floor cleaners, such as floor scrubbers, use water and/or other cleaners to clean a surface, such as a floor. In some cases, the water and/or other cleaners can be left on the floor as spills.

By way of illustration, FIG. 1 illustrates robot 100, which can be a floor scrubber having spill detector 112. Robot 100 has tanks 104, which can hold water and/or cleaning chemicals (e.g., detergent). As robot 100 travels, an amount of water and cleaning chemicals is distributed to the floor (e.g., a surface) through tube 106. Brush 108 then scrubs the floor using the water and cleaning chemicals. Squeegee 118 wipes the dirty water and cleaning chemicals as a scrub vacuum fan, using tube 114 to remove dirty water and cleaning chemicals from the floor. Steering wheel 102 can be used to control robot 100, but in some implementations, robot 100 may be configured to navigate through remote control or autonomously. Robot 100 can have wheels, such as wheel 110. These wheels can be coupled to an actuator 120, which is configured to cause the wheels to move and propel robot 100 forward. In this way actuator 120 can move robot 100 from one location to another location.

Robot 100 can include spill detector 112 and temperature adjuster 116. Temperature adjuster 116 can be used to change the temperature of a scene imaged by spill detector 112. In some implementations, spill detector 112 can be used to detect spills, such as dirty water and cleaning chemicals not wiped and/or vacuumed. Such dirty water and cleaning chemicals can, in some cases, be left in the floor when there are malfunctions, mechanical failures, and/or any other problems with the cleaning system of robot 100, including with tank 104, tube 106, actuator 120, tube 114, squeegee 118, or any other component or subcomponent of robot 100.

By way of illustration, tank 104 could have a leak, wherein excessive liquid (e.g., water) flows to the floor such that not all the water can be and/or is wiped and/or vacuumed. This can leave spills on the floor. As another example, a regulator of tube 106 and/or tank 104 could malfunction and excessive water could be put on the floor, leading to spills forming. As another example, actuator 120 can cause robot 100 to stop (intentionally or through malfunction). If water from tank 104 and tube 106 continues to be distributed to the floor, a spill can form and possibly spread.

As another example, tube 114 can disconnect from robot 100 or squeegee 118 (e.g., in cases where they are connected). This can cause water on the floor to not be vacuumed, leading to spills being left behind robot 100.

As another example, squeegee 118 can dislodge or otherwise be displaced in a way that it may not effectively wipe water from robot 100. In these cases, squeegee 118 may not be wiping the floor effectively leading to spills being left behind robot 100.

Any of the aforementioned examples, alone or in combination, can cause robot 100 to leave a spill. A person having ordinary skill in the art should appreciate that there can be any number of other reasons why robot 100 could leave a spill, and this disclosure is not limited to any particular ones. Moreover, there can be any other of other reasons for spills, such as items falling off shelves in grocery stores, people spilling beverages or cleaning solutions, etc. As previously mentioned, these spills can create hazards for people and objects. If not cleaned up and/or otherwise addressed, the chances of injury and/or property damage increases.

Robot 100 can have a plurality of sides, including front side 122, back side 124, right side 126, and left side (not illustrated). A person having ordinary skill in the art should appreciate that robot 100 can have other sides as well, corresponding to the surfaces of robot 100, which can vary by shape (e.g., rectangular, pyramidal, humanoid, or any designed shape). By way of illustration, front side 122 can be positioned on the forward-facing side of robot 100, where the forward-facing side is forward in the direction of forward movement of robot 100. Back side 124 can be positioned on the backward-facing side of robot 100, where the backward-facing side is the side facing in substantially the opposite direction of the forward facing side. Right side 126 can be the right-hand side relative to front side 122, and left side (not illustrated) can be the left-hand side relative to front side 122.

Figure 2A:
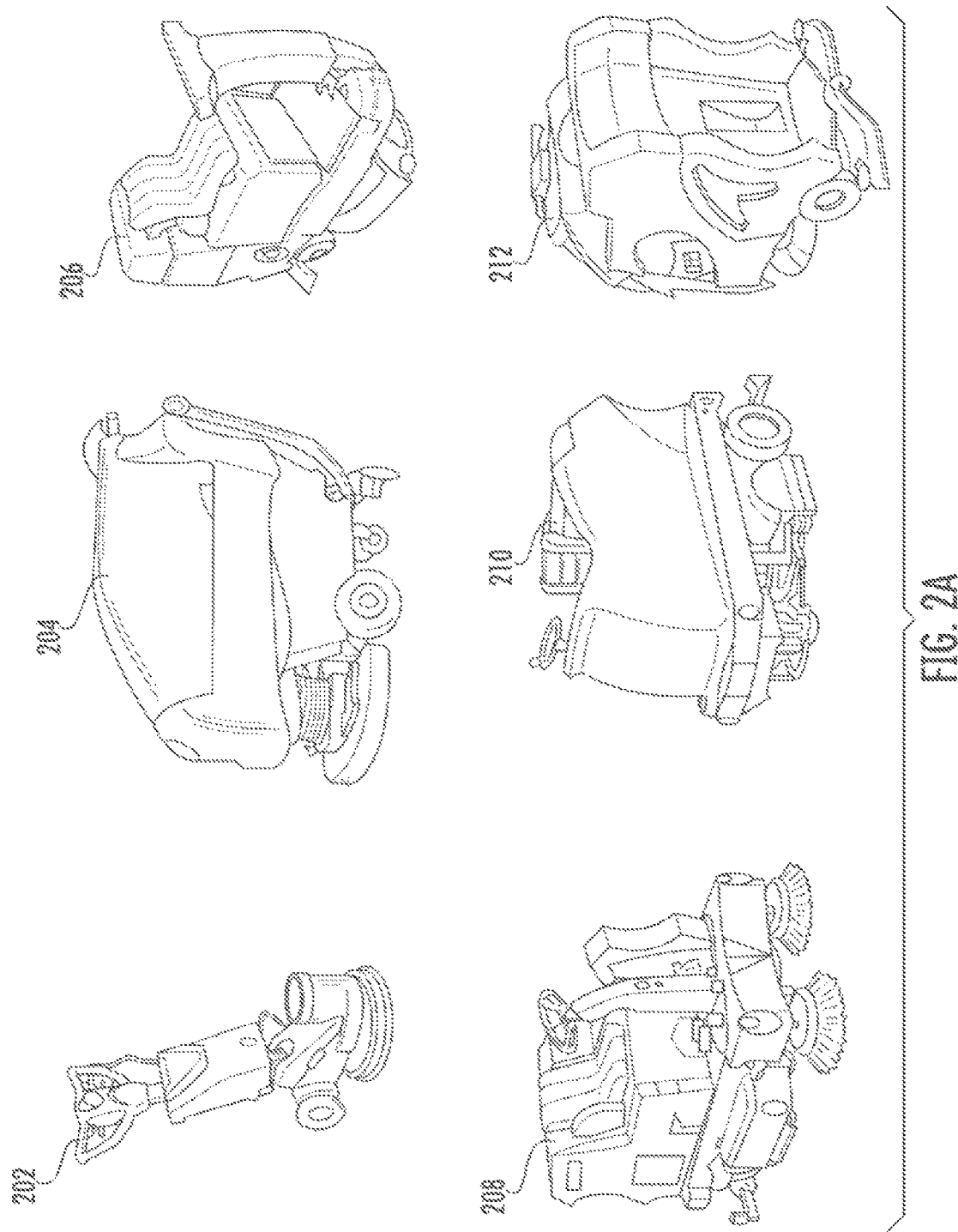
FIG. 2A illustrates various side elevation views of exemplary body forms for floor scrubbers in accordance with some principles of the present disclosure.

A person having ordinary skill in the art should appreciate that robot 100 can have a number of different appearances/forms, even if robot 100 is a floor scrubber. FIG. 2A illustrates six example body forms for a floor scrubber. These are non-limiting examples meant to further illustrate the variety of body forms, but not to restrict robot 100 to any particular body form or even to a floor scrubber. Example body form 202 has an upright shape with a small frame where a user can push the body form 202 in order to clean a floor. In some cases, body form 202 can have motorized propulsion that can assist a user in cleaning, but can also allow for autonomous movement of body form 202. Body form 204 has a larger structural shape than body form 202. Body form 204 can be motorized enabling it to move with little to no user exertion upon body form 204 besides steering. The user may steer body form 204 as it moves. Body form 206 can include a seat, pedals, and a steering wheel, where a user can drive body form 206 like a vehicle as body form 206 cleans. Body form 208 can have a shape that is larger than body form 206 and can have a plurality of brushes. Body form 210 can have a partial or fully encased area where a user sits as he/she drives body form 210. Body form 212 can have a platform where a user stands while he/she drives body form 212.

Figure 2B:
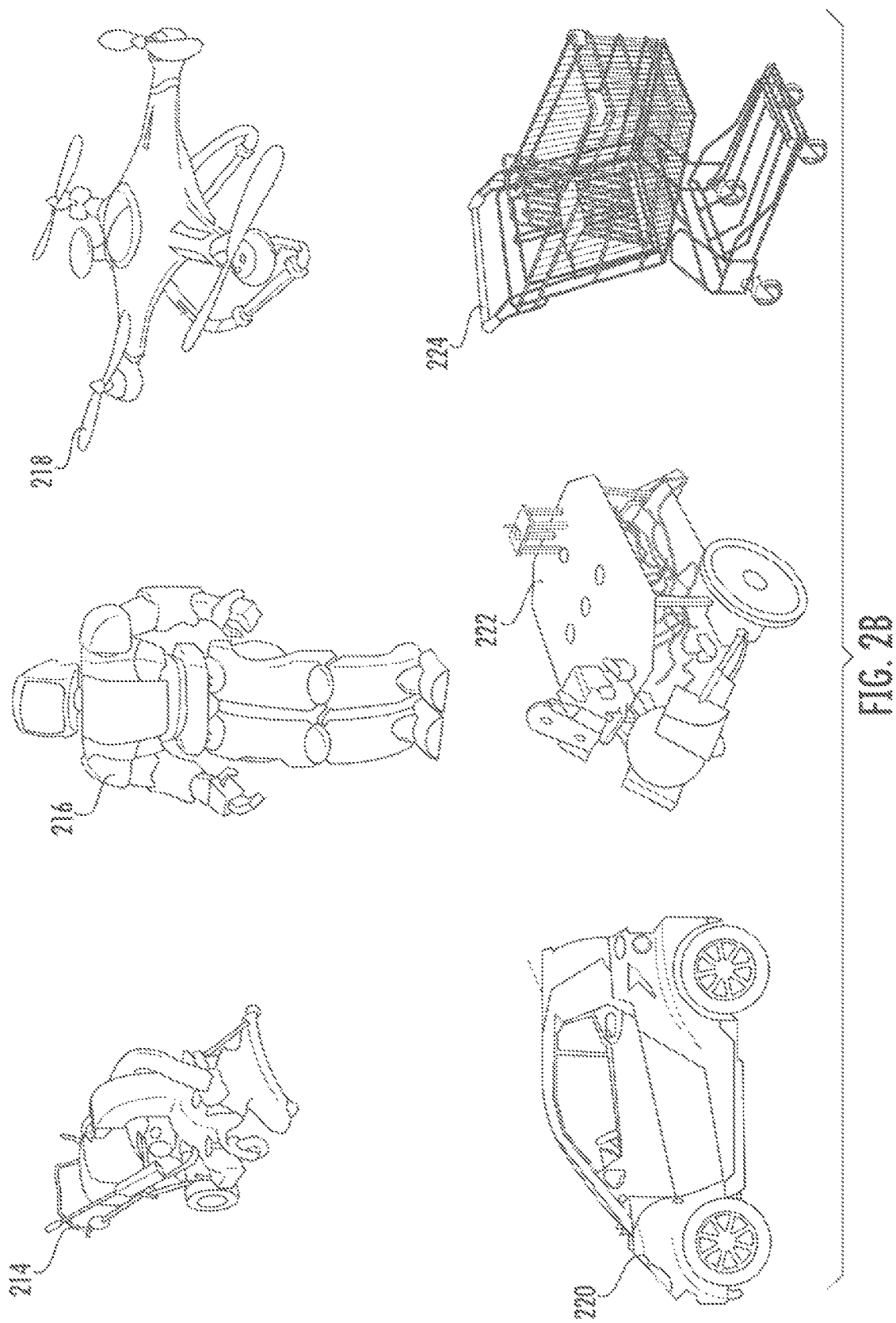
FIG. 2B illustrates various side elevation views of exemplary body forms for a robot in accordance with principles of the present disclosure.

Further still, as described in this disclosure, robot 100 may not be a floor scrubber at all. For additional illustration, and without limitation, FIG. 2B illustrates some additional examples of body forms of robot 100. For example, body form 214 illustrates an example where robot 100 is a stand-up shop vacuum. Body form 216 illustrates an example where robot 100 is a humanoid robot having an appearance substantially similar to a human body. Body form 218 illustrates an example where robot 100 is a drone having propellers. Body form 220 illustrates an example where robot 100 has a vehicle shape having wheels and a passenger cabin. Body form 222 illustrates an example where robot 100 is a rover. Body form 224 illustrates an example where robot 100 is a shopping cart. Body form 224 can be motorized to operate autonomously.

Figure 3:
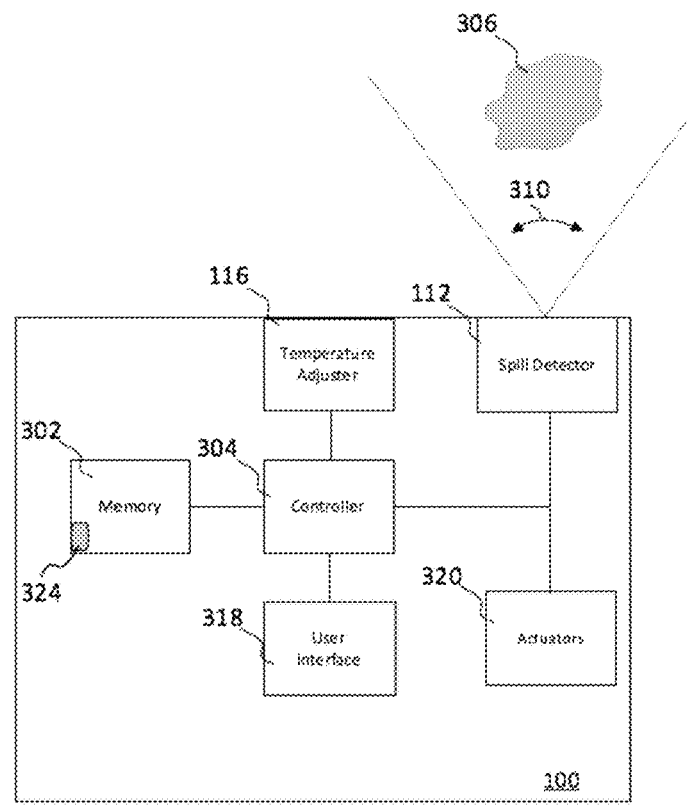
FIG. 3 is a functional block diagram of an exemplary robot in accordance with some implementations of the present disclosure.

FIG. 3 illustrates a functional block diagram of example robot 100 in some implementations. Robot 100 can be a robotic floor cleaner. Robot 100 can include controller 304, memory 302, user interface 318, actuators 320, temperature adjuster 116, spill detector 112, as well as other components and subcomponents not illustrated.

Controller 304 can control the various operations performed by robot 100. Controller 304 can include one or more processors (e.g., microprocessors) and other peripherals. As used herein, processor, microprocessor, and/or digital processor can include any type of digital processing device such as, without limitation, digital signal processors ("DSPs"), reduced instruction set computers ("RISC"), general-purpose ("CISC") processors, microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die, or distributed across multiple components (e.g., circuit dies).

Controller 304 can be operatively and/or communicatively coupled to memory 302. Memory 302 can include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output RAM ("EDO"), fast page mode RAM ("FPM"), reduced latency DRAM ("RLDRAM"), static RAM ("SRAM"), "flash" memory (e.g., NAND/NOR), memristor memory, pseudostatic RAM ("PSRAM"), etc. Memory 302 can provide instructions and data to controller 304. For example, memory 302 can be a non-transitory, computer-readable storage medium having a plurality of instructions stored thereon, the instructions being executable by a processing apparatus (e.g., controller 304) to operate robot 100. In some cases, the instructions can be configured to, when executed by the processing apparatus, cause the processing apparatus to perform the various methods, features, and/or functionality described in this disclosure. Accordingly, controller 304 can perform logical and arithmetic operations based on program instructions stored within memory 302.

In some implementations, memory 302 can store a library 324 of images of, for example, spills. In some implementations, this library 324 can include images of spills with different compositions (e.g., water and/or other chemicals) in different lighting conditions, angles, sizes, distances, clarity (e.g., blurred, obstructed/occluded, partially off frame, etc.), colors, surroundings, etc. The images in library 324 can be taken by a spill detector (e.g., spill detector 112 or any other spill detector) or generated automatically, such as with a computer program that is configured to generate/simulate (e.g., in a virtual world) library images of spills (e.g., which can generate/simulate these library images entirely digitally or beginning from an actual image of a spill or substantially similar objects) from different lighting conditions, angles, sizes, distances, clarity (e.g., blurred, obstructed/occluded, partially off frame, etc.), colors, surroundings, etc. In some implementations, library 324 can include thermal images. Library 324 can be used to train controller 304 to identify spills in many conditions will be discussed more at least with reference to FIG. 11, as well as throughout this disclosure. The number of images in library 324 can depend at least in part on one or more of the number of available images of spills, the variability of the surrounding environment in which robot 100 will operate, the complexity of spills, the variability in appearance of spills, the type of chemicals that may be in spills, and/or the amount of available storage space (e.g., in library 324, memory 302, and/or on a server). For example, library 324 can contain 1, 5, 10, 100, 1000, 10,000, 100,000, 1,000,000, 10,000,000, or any number of images of spills. In some implementations, library 324 may be stored in a network (e.g., cloud, server, etc.) and may not be saved within memory 302. As yet another example, various robots (e.g., that are associated with a manufacturer) can be networked so that images captured by individual robots are collectively shared with other robots. In such a fashion, these robots are able to "learn" and/or share imaging data in order to facilitate the ability to readily detect spills.

In some implementations, user interface 318 can be configured to enable a user to interact with robot 100. For example, user interfaces 318 can include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. User interface 318 can include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. In some implementations user interface 318 can be positioned on the body of robot 100, such as including a screen and/or console located on robot 100. In some implementations, user interface 318 can be positioned away from the body of robot 100, but can be communicatively coupled to robot 100 (e.g., via communication units including transmitters, receivers, and/or transceivers) directly or indirectly (e.g., through a network, server, and/or a cloud). In some cases, user interface 318 can communicate to robot 100 through a server, such as server 400 as will be described with reference to FIG. 4 as well as elsewhere throughout this disclosure. In some implementations, user interface 318 can be located on one or more of access points 402A-N as will also be described with reference to FIG. 4 as well as elsewhere throughout this disclosure.

The wireless connections and/or wireless coupling can include wireless transmissions configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), Personal Area Network ("PAN") (e.g., PAN/802.15), worldwide interoperability for microwave access ("WiMAX"), 802.20, narrowband/frequency-division multiple access ("FDMA"), orthogonal frequency-division multiplexing ("OFDM"), cellular (e.g., 3G, long term evolution ("LTE") (e.g., LTE/LTE-A), time division LTE ("TD-LTE"), global system for mobile communication ("GSM"), etc.), analog cellular, cellular digital packet data ("CDPD"), satellite systems, millimeter wave or microwave systems, acoustic, and infrared (e.g., infrared data association ("IrDA")), and/or any other form of wireless data transmission.

As used herein, networks, servers, and/or clouds can include network interfaces. Network interfaces can include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coax-sys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi can include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

Wired coupling can include wired connections, such as any cable that has a signal line and ground. For example, such cables can include Ethernet cables, coaxial cables, Universal Serial Bus ("USB"), FireWire, and/or any connection known in the art. Such protocols can be used by robot 100 to communicate to internal systems (e.g., communications between any components and/or subcomponents of robot 100) and/or external systems (e.g., computers, smart phones, tablets, data capture systems, mobile telecommunications networks, clouds, servers, and/or the like).

Actuators 320 can include any system used for actuating. For example, actuators 320 can include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art. Actuators 320 can include actuator 120, as described with reference to FIG. 1. In some implementations, actuators 320 can include systems that allow movement of robot 100, such as motorize propulsion. For example, motorized propulsion can move robot 100 in a forward or backward direction, and/or aid in turning robot 100 left or right. By way of illustration, in this way, in this way, actuators 320 can control if robot 100 is moving or is stopped and/or allow robot 100 to navigate from one location to another location.

Actuators 320 can also be configured to actuate other instruments of robot 100, such as turning on/off water, spraying water, turning on/off vacuums, moving vacuum hose positions, turning spill detector 112, turning on/off temperature adjuster 116, turning temperature adjuster 116, and/or any other action. For example, actuators 320 can turn off/on the distribution of water to the floor through tank 104 and tube 106 by controlling a valve (e.g., a mechanical and/or electrical valve) that can turn off/on water flow and/or a water system.

Spill detector 112 can include systems that can be used to detect spill 306. In some implementations, spill detector 112 can include machine-imaging, such as the machine imaging described in U.S. Pat. No. 6,812,846 to Gutta et al., which is incorporated herein by reference in its entirety. Spill detector 112 can include sensors such as a photo camera, video camera, infrared camera, and other cameras. Spill detector 112 can also include other sensors such as microphones, light meters, dynamometer, fluorescence detector, fluorescence imager, capacitance meter, voltmeter, multimeter (e.g., a Digital Multimeter ("DMM")), oscilloscope, ohmmeter, ammeter, etc. In some implementations, spill detector comprises at least one optical imaging device configured to capture at least one image of a scene containing a spill. As will be described with reference to at least FIG. 11 and elsewhere throughout this disclosure, spill detector 112 can take images including images with spill 306 (or other spills) in view. From those images, spill detector 112 can detect the presence of spills. A person having ordinary skill in the art should appreciate that spill 306 can be any shape and is not limited to any particular illustration shown in this disclosure. Indeed, even the same spill 306 can take on different shapes over time as spill 306 spreads, moves, etc. Spill 306 can be any spill described in this disclosure, such as liquids and/or partial liquids, such as water and/or other chemicals.

Spill detector 112 may not be physically located on robot 100. For example, in some cases, spill detector may be attached to a wall, shelf, ceiling, fixture, other shopping carts, furniture, etc. Spill detector can then be communicatively coupled to robot 100, such as using wireless and/or wired coupling. Spill detector 112 can have its own controller (e.g., with a processor) and/or be operatively and/or communicatively coupled to controller 304. Accordingly, processing described in this disclosure, including systems and methods relating to spill detection, can be performed in spill detector 112 and/or a controller such as controller 304.

Figure 4:
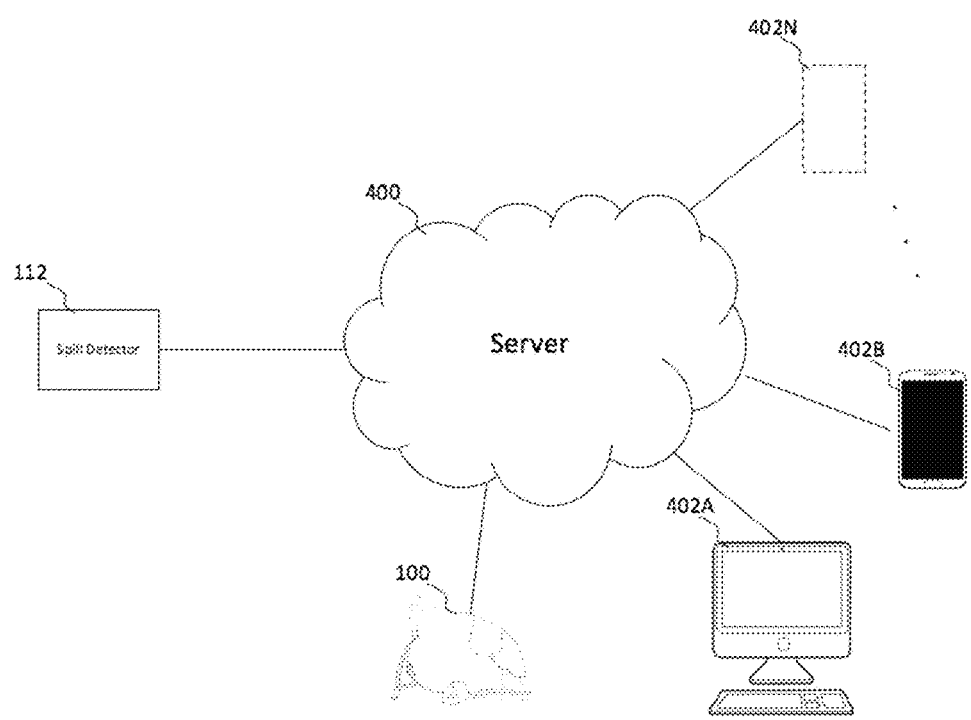
FIG. 4 is a functional block diagram of an exemplary spill detector communicatively coupled to a server in accordance with some implementations of the present disclosure.

In some implementations, spill detector 112 can be communicatively coupled to a server, such as through wired and/or wireless connections. FIG. 4 illustrates a diagram where example spill detector 112 is communicatively coupled to example server 400. Spill detector 112 can send statuses, commands, system errors, data, alerts, warnings, measurement data, summary data regarding measurements, information indicative at least in part of spills, and/or other information relevant to the operation of spill detector 112 and the identification of (e.g., indicating and/or showing the location of) spills. In some implementations, server 400 can comprise a collection of hardware, software, services, and/or resources that can be invoked to instantiate a virtual machine, process, or other resource for a limited or defined duration, or an unlimited or undefined duration. Server 400 can also be called a network, cloud, etc. Server 400 can be communicatively or operatively coupled to a plurality of devices, systems, computers, and/or servers, including devices and/or servers that have access to the interne. Server 400 may also process any data received from spill detector 112. For example, server 400 can use at least in part data received from spill detector 112 and generate an alert (e.g., a message, notification, and/or any form of communication) indicating at least in part whether a spill (e.g., spill 306) has been detected, the status of spill detector 112, the location of a spill, current or past data from spill detector 112, a command or indication of action that should be taken (e.g., action by a user, robot, and/or of access points 402A-402N), and/or other information relevant to a reaction to a spill.

Robot 100 can also be communicatively coupled to a server 400, such as through wired and/or wireless connections. Where spill detector 112 is not in direct communication with robot 100, robot 100 and spill detector 112 can exchange data and/or other communications through server 400. Robot 100 can receive any of the aforementioned data from spill detector 112 and/or processed data from spill detector 112 from server 400. Also, robot 100 can send to server 400 data and/or other communications including statuses, commands, system errors, data, alerts, warnings, measurement data, summary data regarding measurements, information indicative at least in part of spills, and/or other information relevant to the operation of spill detector 112 and/or robot 100. This data and/or other communications can be received from server 400 by spill detector 112 and/or any of access points 402A-402N. Any of the aforementioned data and/or communications between robot 100 and server 400 and/or spill detector 112 and server 400 can also be communicated directly between one or more of spill detector 112, robot 100, and access points 402A-402N.

Access points 402A-402N, can include devices, systems, and/or servers, such as, but not limited to, computers, mainframes, remote operating centers, mobile devices, tablets, smart phones, cells phones, personal digital assistants, phablets, smart watches, set-top boxes, and/or any device with access to the internet and/or any network protocol. As used herein the "N" in access points 402A-402N indicates at least in part that there can be any number of access points, and this disclosure is not limited to any particular number of access points, nor does this disclosure require any number of access points. Access points 402A-402N can be communicatively coupled to server 400, such as through wired and/or wireless connections. Each of access points 402A-402N can send and/or receive information to/from server 400. For example, each of access points 402A-402N can send data and/or communications such as statuses, commands, system errors, measurement data, alerts, warnings, and/or other data and/or communications. Through server 400, access points 402A-402N can receive, for example, at least a portion of the data and/or communications sent by spill detector 112 to server 400, processed data by server 400 (e.g., from the data received by server 400 from spill detector 112), at least a portion of the data and/or communications sent by robot 100 to server 400, at least a portion of the data and/or communications sent by one or more of access points 402A-402N, and/or any other data on server 400.

By way of illustrative example, access point 402A can include a computer or set of computers. In some cases the computers of access point 402 can be part of a remote operations controller ("ROC") and/or control station. In this role, access point 402 can be used to monitor and/or control one or more of spill detector 112, robot 100, and/or any of access points 402A-402N. Advantageously, access point 402A can be used to monitor spill detector 112 and/or determine if there are any issues (e.g., if there are any spills).

If there are any issues, access point 402A can send alerts, commands, and/or other communications to robot 100. For example, access point 402A can send a command and/or alert to robot 100 which can cause at least in part robot 100 to stop and/or turn off its cleaning system (e.g., by turning off one or more actuators of actuators 320), as will be described later in this disclosure with reference to FIG. 11 as well as elsewhere throughout this disclosure. As another non-limiting example, access point 402A can give robot 100 navigation instructions, such as directing robot 100 to turn, go to a particular location, and/or generally remote control robot 100. Similarly, access point 402B can include a mobile device that can be configured with similar monitoring and/or controlling capabilities as access point 402A.

Figure 5:
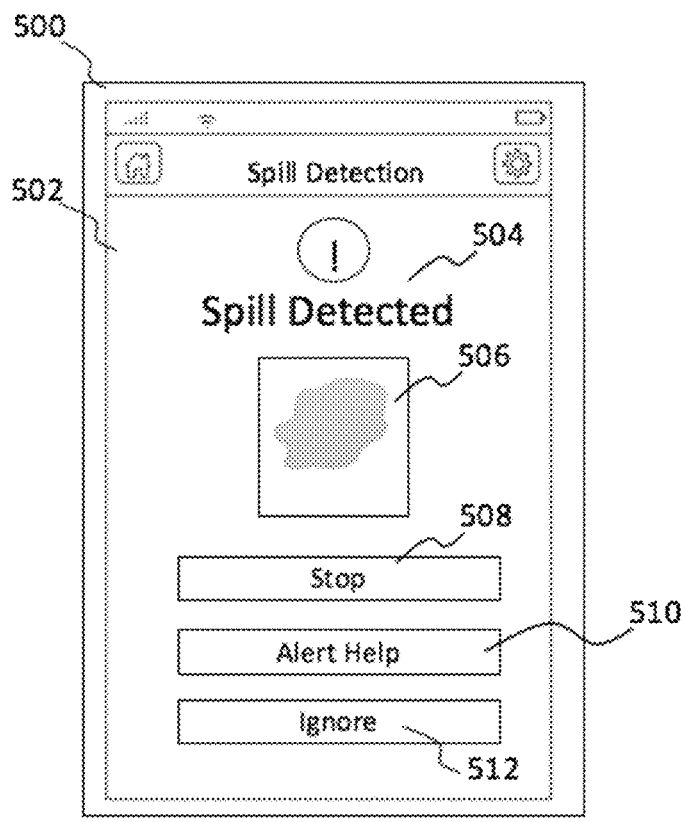
FIG. 5 is an exemplary user interface for alerting a user of a detected spill in accordance with principles of the present disclosure.

FIG. 5 illustrates an example interface 500 that can be used to alert a user of a detected spill 306. Interface 500 can be any user interface discussed in this disclosure, such as user interfaces discussed with reference to user interface 318. As illustrated, the appearance of interface 500 is merely for illustrative purposes, and any number of other appearances is contemplated. A person having ordinary skill in the art would appreciate that interface 500 can be adapted for display on any interface, such as any display discussed in this disclosure, including those displays discussed with reference to user interface 318. Interface 500 can show display 502. When a spill is detected, panel 504 can display an alert indicative at least in part that a spill has been detected. Other information can be displayed in addition or in the alternative to panel 504, including information relevant to robot 100 and/or spill detector 112 such as statuses, commands, system errors, data, alerts, warnings, measurement data, summary data regarding measurements, information indicative at least in part of spills (e.g., spill 306), and/or other information relevant to the operation of spill detector 112 and identifying (e.g., indicating and/or showing the location of) spills.

Panel 506 can include any data measured by spill detector 112. For example, where spill detector 112 includes a camera, such as a red-green-blue ("RGB") camera, photo camera, video camera, infrared camera, and other cameras, panel 506 can show the camera image. By way of illustration, the camera image can be a RGB camera image of spill 306. As another example, the image can be an infrared image (e.g., a thermal image), such as the infrared images that will be described with reference to FIGS. 7A-7E, 10A-10C, as well as elsewhere throughout this disclosure. A person having ordinary skill in the art should appreciate other images can also be displayed, such as images that comprise of data associated with pixels (e.g., where pixels correspond to locations in an imaged scene). For example, the image can be a matrix that stores a plurality of values, such as one or more measurement values (e.g., measurements, measured temperatures, relative temperatures, etc.), representative colors, luminance, chrominance, and/or other data/information. The images may not appear as a spill 306 would to human eyes. The images and/or panel 506 can also display other data of spill detector 112, such as data from microphones, light meters, dynamometer, fluorescence detector, fluorescence imager, capacitance meter, voltmeter, multimeter (e.g., a Digital Multimeter ("DMM")), oscilloscope, ohmmeter, ammeter, etc.

Display 502 can also present a user with selectable options, such as options 508, 510, 512. Options 508, 510, 512 can allow a user to perform an action in response to what is displayed in one or more of panels 504, 506, such as an indication that a spill has been detected. For example, option 508 can be a stop option that tells robot 100 to stop. In the case where robot 100 is a floor cleaner, such as a floor scrubber, the stop option can send a signal to robot 100 to actuate one or more actuators 320, causing robot 100 to, for example, stop moving, turn off a water system and/or water flow, stop cleaning (e.g., stop a brush and/or cleaning system), etc. As another example, option 510 can be an alert help option that sends a signal to robot 100 and/or a different electronic apparatus or device (e.g., one or more of access points 402A-402N) to generate an alert about spill 306. For example, option 510 can cause user interface 500 and/or robot 100 to send a short message service ("SMS"), text, email, or other communication to a viewer who can go clean up spill 306. Option 510 could also trigger an alert, such as an alarm, flashing light, sound, and/or any other way of getting someone's attention to clean up spill 306. As another example, option 512 can be an ignore option where the user tells robot 100 and/or spill detector 112 to continue operation and ignore spill 306. In some cases, the ignore option can be indicative at least in part that spill 306 is not an actual spill and/or is a false positive. In some cases, the ignore option may be used when spill 306 is an actual spill, but is just not a concern due to its size, location, timing (e.g., at night when no one would slip on it), was intentionally placed, and/or any other characteristic. In some cases, panel 506 can inform a user of what spill 306 looks like so that the user can select one or more of options 508, 510, 512, and/or perform any other action described in this disclosure.

Figure 6:
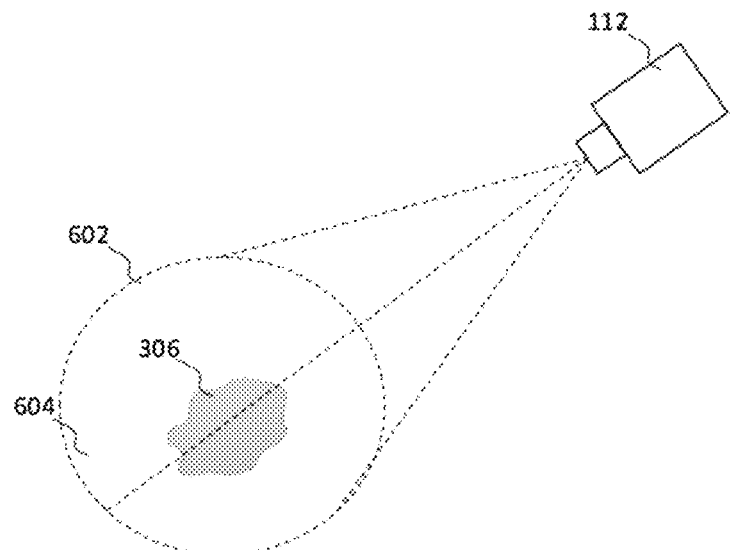
FIG. 6 is a side elevation view of an exemplary spill detector imaging a spill on a surface in accordance to some principles of the present disclosure.

FIG. 6 illustrates spill detector 112 imaging an example spill 306 on example surface 604. As illustrated, spill detector 112 can have field of view 602. As previously described with reference to at least FIGS. 1, 3, 4, as well as elsewhere throughout this disclosure, spill detector 112 can be a component of and/or be connected to robot 100 in some implementations. In other implementations, spill detector 112 can be separate and/or not attached to robot 100, but can be communicatively coupled to robot 100 and/or server 400.

In the case where spill detector 112 includes an infrared camera, spill detector 112 can measure temperatures (e.g., in Celsius, Kelvin, Fahrenheit, etc.), or relative temperatures, within field of view 602. The infrared camera can be single beam or multi-beam. In some cases, the infrared camera can be coupled to an actuator that enables it to view a plurality of scenes in field of view 602. As previously mentioned, any spill detector 112 can similarly be coupled to an actuator.

By way of illustration, the infrared camera can detect infrared energy (e.g., heat) and convert that detected infrared energy into an electronic signal, which can then be processed to produce what is sometimes called a thermal image or heat map. The thermal image can contain pixels, wherein each pixel represents a location of an imaged space and has a value corresponding to a temperature (e.g., a temperature measurement or a relative temperature). For example, the temperature can be a measured value (e.g., based at least in part on detected infrared energy), wherein the infrared camera takes measurements at least in part in field of view 602 and then uses a calibration function (e.g., instantiated in software and/or hard-coded) that converts the measurements into a temperature reading. As another example, the infrared camera can take measurements (e.g., based at least in part on detected infrared energy) and represent the measurements based at least in part on their relative magnitude. For example, the measurements can be luminance values used to color a thermal image, where different colors on a scale (e.g., having one or more colors in the visible spectrum ordered by wavelength) indicate at least in part relative colors, where colors closer to one color in the scale represents cooler temperatures and colors closer to another color in the scale represent warmer temperatures. In some implementations, the thermal image can be visualized (e.g., on a user interface and/or stored in memory) as a picture having colors that correspond to the measurements at each pixel. In this way, a thermal image can be viewed. In some implementations, the thermal image may comprise a matrix (e.g., an m×n matrix having m rows and n columns) where each cell of the matrix can represent a pixel of the thermal image, and each cell of that matrix stores the corresponding measurement value (e.g., measurements, measured temperatures, relative temperatures, etc.). In some cases, a thermal image can be a matrix that stores a plurality of values, such as one or more measurement values (e.g., measurements, measured temperatures, relative temperatures, etc.), representative colors, luminance, chrominance, and other data/information.

In some implementations, where spill detector 112 includes a plurality of cameras and/or other sensors, images can be 3D images. By way of illustration, a first camera can take a first image at a first angle. This first image can be 2D having $X_1$-$Y_1$ dimensions (which can be mapped with $X_1$,$Y_1$ coordinates). At substantially the same time, a second camera can take a second image at a second angle. This second image can be 2D having $X_2$-$Y_2$ dimensions (which can be mapped with $X_2$, $Y_2$ coordinates). Controller 304 can receive the first image and second image. In some cases, controller 304 can create a 3D image based at least in part on $X_1$-$Y_1$ dimensions from the first image and a $Z_1$ dimension calculated at least in part on the $X_2$-$Y_2$ dimensions of the second camera. In some implementations, the first camera can be substantially orthogonal to the second camera and/or lie in substantially the same horizontal plane. In those cases, the 3D map can be generated in some implementations by taking the $X_1$-$Y_1$ dimensions of the first image and the $X_2$ dimension of the second image. However, in some cases, the first camera, the second camera, and/or any other sensor may not be substantially orthogonal and/or not and/or lie in substantially the same horizontal plane to each other. In these cases, controller 304 can construct the three-dimensional map using three-dimensional reconstruction from line projections based at least in part on the images taken from the first camera, the second camera, and/or any other sensor. In some cases, the first camera and second camera can be at least one of an RGB camera, IR camera, photo camera, video camera, etc. Where an IR camera is used, the first and second images can be thermal images.

II. Thermal Imaging to Detect Spills

FIGS. 7A-7E illustrates example thermal images 700A-700E taken of example spill 306 by example spill detector 112 that includes an infrared camera. In these example thermal images 700A-700E, a visible light image outline is overlaid on the thermal image as an intensity modulation pattern. It should be noted that this is for illustrative purposes, and a person having ordinary skill in the art should appreciate that the images may or may not include the visible light image outline, where the visible-light modulation pattern may be absent without the visible light image outline.

Example spill 306 is represented as spill image 716A-716E in thermal images 700A-700E, respectively. Similarly, surface 604 is represented as surface image 718A-718E in thermal images 700A-700E, respectively. By way of illustration, thermal images 700A-700E were taken using an infrared camera in an experiment using tap water that is substantially similar in temperature to the ambient environment including surface 604, however, it should be understood by a person having ordinary skill in the art that spill 306 can have different shapes and compositions, as described in "I. Overview" as well as elsewhere throughout this disclosure. Also, spill 306 can be different temperatures, such as warmer or cooler than the ambient environment including surface 604. Thermal images 700A-700E can include images that have values indicative at least in part of reflectance (e.g., IR reflectance values) and/or emission at each pixel location, wherein the pixel locations correspond to a position in field of view 602.

Thermal image 700A of FIG. 7A includes spill image 716A of spill 306 when spill 306 is a new spill, such as taken by spill detector 112 substantially right after (e.g., within approximately 10 seconds) spill 306 contacted surface 604. Thermal image 700B of FIG. 7B includes spill image 716B of spill 306 approximately one minute after spill 306 contacted surface 604. Thermal image 700C of FIG. 7C includes spill image 716C approximately two minutes after spill 306 contacted surface 604. Thermal image 700D includes spill 306 approximately after three minutes after the spill occurred. Thermal image 700E includes spill 306 approximately after five minutes after the spill occurred.

In some implementations, thermal images 700A-700E can be displayed on a user interface 318 where a user can select, e.g., by placing reticules 704A-704E, a location at which the user desires to view a temperature as displayed on temperature display panels 702A-702E. As displayed on user interface 318, thermal images 700A-700E can include bars 710A-710E, respectively. Bars 710A-710E can indicate the pixel brightness values displayed at locations within thermal image 700A-700E. In some cases, bars 710A-710E can include a range of values from a low value to a high value, wherein the low value corresponds to one color and the high value corresponds to another color, and a gradient of colors in-between. By way of illustrative example, bar 710A has a low value of 16.7 degrees Celsius and a high value of 25.0 degrees Celsius. The low value of 16.7 degrees Celsius is associated with a black color, whereas the high value of 25.0 degrees Celsius is associated with a white color. The temperatures between 16.7 degrees Celsius and 25.0 degrees Celsius are represented by a continuous spectrum (e.g., a gradient) of colors between the black and white, wherein the colors of pixels in thermal image 700A that are closer to white are closer to the high value of 25.0 degrees Celsius and the colors closer to black are closer to the low value of 16.7 degrees Celsius. The other images 700B-700E have substantially similar bars 710B-710E and similar representations/associations. Accordingly, a viewer of one or more of thermal images 700A-700E on user interface 318 may be able to discern the relative and/or approximate temperatures of any given pixel/location on thermal images 700A-700E by comparing the colors as they appear at those pixels/locations with the colors illustrated in bars 710A-700E. Other representations can also be made in thermal images, including of thermal luminosity and chrominance, as well as spectral properties of emitted, reflected, scattered, and/or absorbed radiation.

A person having ordinary skill in the art should appreciate that thermal images 700A-700E can also be displayed on user interface 318 without temperature display panels 702A-702E and bars 710A-710E. Similarly, thermal images 700A-700E can be stored in memory 302 with or without temperature display panels 702A-702E and bars 710A-710E. In some cases, where thermal images 700A-700E are stored in memory 302 and not viewed, each pixel may or may not have an associated color. Rather, in some implementations, temperatures, reflectance values, emission values, and/or other measurements can be associated with each pixel. Bad pixels (e.g., inaccurate or erroneous pixels) can be removed, and/or additional image processing can be applied.

As illustrated in thermal images 700A-700E, as time progressed after a spill event, spill 306 became more discernable as spill images 716A-716E in the respective thermal images 700A-700E. For example, in thermal image 700A, which can be taken right after spill 306 occurred, spill image 716A may be difficult to discern, indicative at least in part that spill 306 was a substantially similar temperature as surface 604. Edge 706A appears as a different color indicating at least in part that edge 706A was measured as a slightly cooler temperature than the portion of surface 604 imaged as surface image 718A. Center spill area 708A appears substantially similar in color to surface 604 because it is substantially similar in temperature. It is possible that such temperature differences can be observable due at least in part to evaporative cooling, wherein the outer edges of spill 306 cool more rapidly than more center portions, such as center spill area 708A. This property may improve spill detection, such as through pattern recognition.

Example thermal image 700B, which can be taken one minute after spill 306 occurred, illustrates that edge 706B appears slightly darker than edge 706A, indicative at least in part of a lower relative temperature. Center spill area 708B also appears relative darker and more visually defined than center spill area 708A. A person having ordinary skill in the art should appreciate that some deviation in temperature measurements is possible due to measurement deviations, ephemeral phenomenon, instabilities in the measuring environment, noise, etc. Accordingly, the apparent slight uptick in temperature (e.g., as indicated in bar 710B and temperature display panel 702B as compared to bar 710A and temperature display panel 702A) may not represent an actual increase in temperature.

Similarly, in example thermal image 700C, which can be taken two minutes after spill 306 occurred, edge 706C and center spill area 708C appear relatively darker as compared to edge 706B and center spill area 708B. Similarly, in thermal image 700D, which occurred three minutes after spill 306 occurred, edge 706D and center spill area 708D appear relatively darker as compared to edge 706C and center spill area 708C. And finally, in thermal image 700E, which occurred five minutes after spill 306 occurred, edge 706E and center spill area 708E appear relatively darker as compared to edge 706D and center spill area 708D.

Accordingly, as more time passes after spill 306 occurred, the appearance of spill 306 as imaged by an infrared camera of spill detector 112 becomes more defined as compared to surface 604. As previously mentioned, spill 306, which was imaged in thermal images 700A-700E, was of a substantially similar temperature as surface 604 when spill 306 occurred. Accordingly, spill 306, as imaged as spill image 716A-716E, became more visible in the infrared camera as spill 306 cooled by evaporative cooling. In some implementations of this disclosure, a thermal image of spill 306 can be taken. Based at least in part on being able to distinguish spill 306 from surface 604 through the thermal image, spill 306 can be identified. For example, one or more of spill image 716A-716E can be identified using image segmentation.

As previously mentioned, in some implementations, spill detector 112 is connected to robot 100. Where robot 100 is mobile (such as where robot 100 is a floor cleaner (e.g., floor scrubber), cart, or any other robot described in this disclosure), robot 100 may be moving for periods of time. Accordingly, robot 100 may not have minutes to wait for spill 306 to become visible.

In some implementations, robot 100 can have temperature adjuster 116 (as described with reference to FIG. 3 as well as elsewhere throughout this disclosure) to facilitate temperature change of spill 306 so that spill 306 becomes more discernable in images, and more easily segmented.

For example, FIG. 8 illustrates an example fan 800 configured to blow air onto spill 306. Temperature adjuster 116 can include fan 800. Fan 800 can include mechanical fans, fans with blades, bladeless fans, centrifugal fans, propeller fans, vanaxial fans, etc. Fan 800 can blow air directionally, such as blowing air in a direction of spill 306.

By blowing on spill 306, fan 800 can facilitate the lowering of the temperature of spill 306, which can allow spill 306 to be more discernable when imaged by an infrared camera of spill detector 112. For example, fan 800 can accelerate evaporative cooling of spill 306, causing spill 306 to cool faster. By way of illustration, the discernibility as reflected in thermal image 700B-700E, which were taken minutes after spill 306 occurred, could be reflected in a thermal image taken seconds after spill 306 occurred with example fan 800 blowing onto spill 306.

When attached to robot 100, and as part of temperature adjuster 116, fan 800 can be positioned distally facing from back side 124, and blow distally from back side 124. Advantageously, this can allow fan 800 to facilitate imaging of spills that originate from robot 100. For example, where robot 100 is a floor cleaning unit, such as a floor scrubber, spills can emanate from robot 100 in ways described herein with reference to FIG. 1 as well as elsewhere throughout this disclosure. When robot 100 moves forward, the spills (e.g., spill 306) can come into the field of view 602 of spill detector 112. Advantageously, where spill detector 112 is attached to a mobile robot 100, accelerating the cooling of spill 306 can allow spill detector 112 to detect spill 306 before robot 100 moves and spill 306 is out of range (e.g., out of field of view 602) of spill detector 112. However, other placements of fan 800 (and temperature adjuster 116) as well as spill detector 112 are also contemplated. Fan 800 and spill detector 112 can be positioned anywhere on the body of robot 100, such as on right side 126, front side 122, left side (not illustrated), underneath robot 100, on top of robot 100, etc. Advantageously, where robot 100 seeks out spills, having spill detector 112 and/or temperature adjuster 116 extend in a forward direction from front side 122 can allow robot 100 to detect spills in front of it. Having spill detector 112 and/or temperature adjuster 116 beneath robot 100 can allow robot 100 to detect spills robot 100 passes over. As mentioned in this disclosure, fan 800 and spill detector 112 can be positioned elsewhere, not on the body of robot 100.

Other apparatuses can be used in the alternative or in combination with fan 800 in spill detector 112 in order to facilitate cooling of spill 306 relative to surface 604. For example, a cool air stream can be created using suction, such as by a combination of evaporative and adiabatic and/or Joule-Thomson cooling. Here, in some cases, a suction hose can serve as a heat sink for the heat exchange due to, for example, the Joule-Thomson effect for cooling.

As another example, one or more temperature measurement devices (e.g., thermocouples, thermistors, IR sensors, etc.) may be incorporated on robot 100 to provide information (e.g., direct or indirect, absolute or relative, etc.) about the temperature of the cleaning fluid, floor, exhaustion, parts of robot 100, and/or the environment. The data from these measurement devices can be used by spill detector 112, and methods and/or algorithms performed by spill detector 112, to improve spill detection performance.

Figure 9:
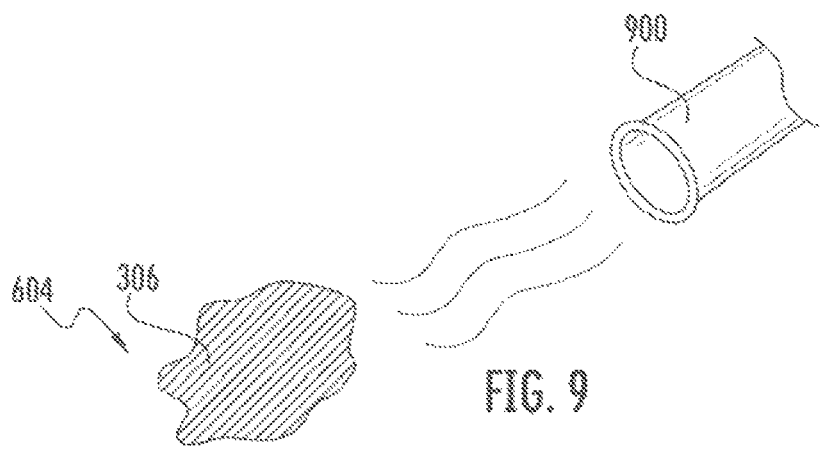
FIG. 9 is a side elevation view of an exemplary heating apparatus that can heat a spill in accordance with some implementations of the present disclosure.

As another example, the specific heat of spill 306 and surface 604 can be different. Accordingly, cooling or heating surface 604 as well as spill 306 can enhance their contrast in an image, such as a thermal image taking by a thermal camera (e.g., IR camera). FIG. 9 illustrates an example heating apparatus 900 that can heat spill 306. Temperature adjuster 116 can include heating apparatus 900. In some implementations, heating apparatus 900 can include an electric heater, infrared heater, heat gun, furnace, water heater, oil heater, and/or any heater known in the art. For example, and without limitation, where heating apparatus 900 is an electric heater, it can comprise a fan and heating coil (e.g., high resistance wires). The heating coils can heat proximal air, and the fan can blow the warmed air from heating apparatus 900.

Figure 10A:
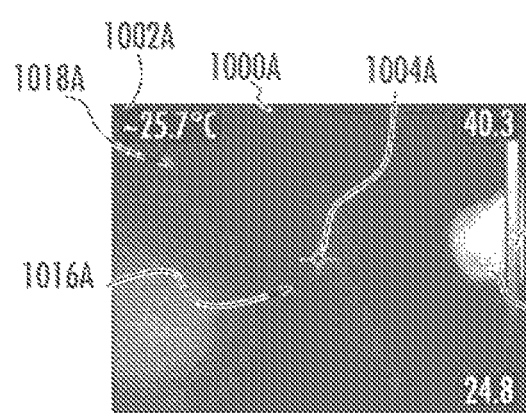
FIGS. 10A-10C are exemplary thermal images taken when an example heating unit heats a spill in accordance with some implementations of the present disclosure.
Figure 10B:
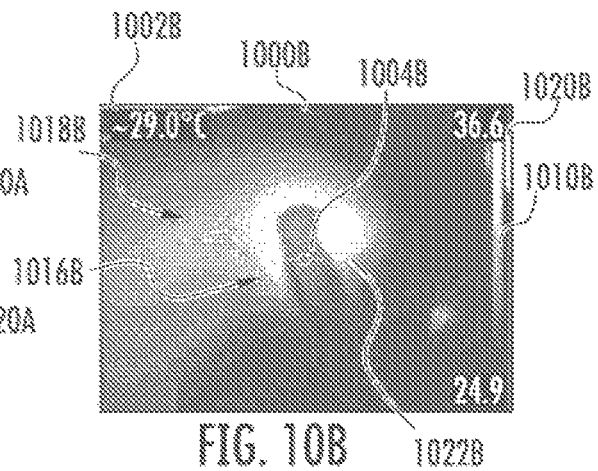
Figure 10C:
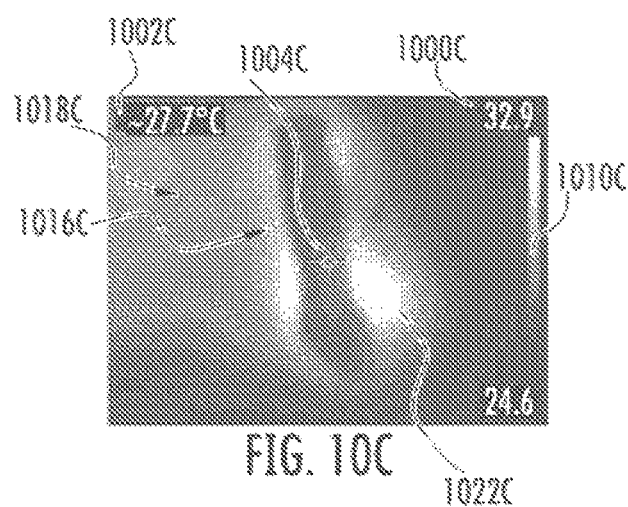

Heating spill 306 and surface 604 can enhance imaging of spill 306 with a camera, such as an IR camera, because spill 306 can heat at a different rate than surface 604. FIG. 10A-10C illustrates thermal images 1000A-1000C, where heating unit 900, appearing as heating unit images 1020A-1020B, heats spill 306, appearing as spill images 1016A-1016C. Surface 604 appears as surface images 1018A-1018C. Substantially similar to thermal images 700A-700E described with reference to FIGS. 7A-7E, thermal images 1000A-1000C include reticules 1004A-1004C, temperature display panels 1002A-1002C, and bars 1010A-1010C.

Thermal image 1000A can be taken as heating unit 900 comes to bear. Accordingly, spill 306 and surface 604 have yet to be heated by heating unit 900. As such spill image 1016A appears as a substantially similar color to surface image 1018A, and in some instances, may be difficult to distinguish and/or segment because of that substantial similarity.

Thermal image 1000B was taken when heating unit 900 directly hits a portion of spill 306, appearing as image portion 1022B. Image portion 1022B illustrates the area where heat from heating unit 900 heats spill 306 and surface 604. The portion of image portion 1022B corresponding to surface image 1018B appears whiter as compared to the portion of image portion 1022B corresponding to spill image 1016B. In some cases, this color difference may be due to a temperature difference, wherein spill 306, as represented by spill image 1016B, changes temperature more slowly than surface 604, represented by surface image 1018B. Accordingly, when heat from heating unit 900 heats a portion of surface 604 and spill 306, this portion represented by image portion 1022B, the temperature of surface 604 heated by heating unit 900 heats faster than the portion of spill 306 heated by heating unit 900. This creates temperature differentiation, which can result in color differentiation in thermal image 1000B. Further temperature/color differentiation can facilitate segmentation and allow spill 306 to be more readily identified.

Thermal image 1000C can be taken when heating unit 900 hits a larger portion of surface 604 and spill 306, such as by being further away and/or having a wider spread (e.g., by adjusting airflow or the size of the aperture in which hot air flows). The results are substantially similar to what was observed in thermal image 1000B. Image portion 1022C illustrates the area where heat from heating unit 900 heats spill 306 and surface 604. Again, the portion of image portion 1022C corresponding to surface image 1018C appears whiter as compared to the portion of image portion 1022C corresponding to spill image 1016C. Having such distinguishability can further facilitate segmentation and/or the identification of spill 306.

Returning to FIG. 9, in some implementations, heating apparatus 900 can be an exhaust of robot 100. Robot 100 may have exhausts, or other apparatuses, to disperse heat from, for example, friction, motors, electronic parts, and/or any component of robot 100. In some cases, the exhaust can be an aperture that allows airflow, such as airflow over heat sinks. In some cases, the exhaust can be coupled with fans and/or other mechanisms for facilitated convection, such as pumps, suction devices, exchangers, radiators, etc.

As previously mentioned, temperature adjuster 116, and consequently heating apparatus 900, can be positioned distally facing from back side 124. Advantageously, this can allow heating apparatus 900 to facilitate imaging of spills that originate from robot 100. For example, where robot 100 is a floor cleaning unit, such as a floor scrubber, spills can emanate from robot 100. Thus, when robot 100 moves forward, the spills (e.g., spill 306) can come into field of view 602 of spill detector 112. Advantageously, where spill detector 112 is attached to a mobile robot 100, heating spill 306 and surface 604 can allow spill detector 112 to detect spill 306 before robot 100 moves and spill 306 is out of range (e.g., out of field of view 602) of spill detector 112. However, other placements of heating apparatus 900 (and temperature adjuster 116) as well as spill detector 112 are also contemplated. Heating apparatus 900 and spill detector 112 can be positioned anywhere on the body of robot 100, such as on right side 126, front side 122, left side (not illustrated), underneath robot 100, on top of robot 100, etc. Advantageously, where robot 100 seeks out spills, having spill detector 112 and/or temperature adjuster 116 extend in a forward direction from front side 122 can allow robot 100 to detect spills in front of it. Having spill detector 112 and/or temperature adjuster 116 beneath robot 100 can allow robot 100 to detect spills robot 100 passes over. As mentioned in this disclosure, heating apparatus 900 and spill detector 112 can be positioned elsewhere, not on the body of robot 100.

In some cases, a natural exhaust of robot 900 can be modified to direct the exhaust in a different direction, such as distally facing from back side 124. Such a modification can be made by appending tubing (e.g., metal tubing) to a pre-existing exhaust to the desired direction (e.g., distally facing from back side 124, right side 126, front side 122, left side (not illustrated), underneath robot 100, on top of robot 100, etc.). In some cases, the appended tubing may be coupled to a valve to provide a seal and/or to direct air flow from the pre-existing exhaust to the appended tubing. There can be other ways heating and/or cooling spill 306 and/or surface 604 to facilitate imaging. For example, microwaves, radiation, and/or electromagnetic waves can be emitted, which can causes, at least in part, greater temperature change in spill 306 than in surface 604, causing spill 306 to be distinguishable from surface 604 in a thermal image.

In some implementations, the temperature of spill 306 (e.g., water, aqueous solutions, oil, etc.) itself can be changed to enhance imaging. For example, water, aqueous solutions, oil, etc. in robot 100 can be heated, such as by using a heater and/or by heat from, for example, friction, motors, electronic parts, and/or any component of robot 100. If the heat of the water, aqueous solutions, oil, etc. in robot 100 exceeds that of the environment and/or surface 604, when the water, aqueous solutions, oil, etc. spill onto surface 604 as spill 306, spill 306 will be hotter than surface 604. Accordingly, spill 306 and surface 604 can be readily distinguished in a thermal image by camera 112. Similarly, in some implementations, water, aqueous solutions, oil, etc. in robot 100 can be cooled, such as with air conditioner(s), refrigerator(s), heat exchanger(s), fan(s), suction(s), cooling bead(s), etc. In some cases, such cooling can be accomplished through evaporative cooling, adiabatic expansion, Joule Thomson effects, and other thermodynamic effects. If the water, aqueous solutions, oil, etc. in robot 100 are cooler than the environment and/or surface 604, when the water, aqueous solutions, oil, etc. spill onto surface 604 as spill 306, spill 306 will be cooler than surface 604. Accordingly, spill 306 and surface 604 can be readily distinguished in a thermal image by camera 112.

If spill 306 does not originate from robot 100, the water, aqueous solutions, oil, etc. of spill 306 can be a different temperature based at least in part on where it was before spilling. For example, in a store, certain items may be heated, such as under heat lamps, lights, heaters, etc. If these items spill as spill 306, spill 306 may be warmer than surface 604 and can be readily distinguished in a thermal image by camera 112. As another example, in a store, certain items may be cooled, such as by refrigeration, freezing, etc. If these items spill as spill 306, spill 306 may be cooler than surface 604 and can be readily distinguished in a thermal image by spill detector 112.

In some cases, spill detector 112 can image after a predetermined amount of time (e.g., 5, 10, 15, 20, 25, 30 or more seconds, or 1, 2, 3, 4, or more minutes). The predetermined amount of time can depend on the desired distinguishability of the spill 306 from surface 604, where the longer the time, the more distinguishable spill 306 is from surface 604. Also, temperature adjuster 116 can make spill 306 more distinguishable from surface 604 in less time. However, this predetermined amount of time can be weighed against a desire to cover more area for spill detection, and other practical limitations such as a desire to clean a floor in a desired amount of time. For example, where spill detector 112 is attached to robot 100, robot 100 can stop periodically (e.g., after a predetermined distance, such as 1, 2, 3, 4 or more feet, dependent on the field of view of spill detector 112) to allow spill detector 112 to detect spills.

III. Other Sensors for Detecting Spills

In some implementations, additional information can be obtained in addition to or in the alternative to image(s). For example, in some implementations, spill detector 112 can include other sensors, such as any of the aforementioned sensors discussed with reflectance and/or emission to FIG. 3. Spill detector 112 can process the information from these other sensors along with any image(s) taken. In some cases, if one or more of the image(s) and information from these other sensors are indicative at least in part of a spill 306, spill detector 112 (and/or robot 100) can prompt a user to get feedback (e.g., using display 502) and/or perform an action in response to detecting a spill 306.

For example, spill detector 112 can include one or more light meters that can detect the light reflectance and/or emission off surfaces. In some cases, ambient light can reflect off spill 306 and/or surface 604. In some cases, light projected from spill detector 112, such as light from a light bulb, light emitting diode ("LED"), lamp, laser, flash, and/or any other light source can be included in spill detector 112. From the ambient light and/or light projected from spill detector 112, spill 306 can have different reflectance and/or emission properties than surface 604. These reflectance and/or emission properties include the amount (e.g., intensity) of light reflected off the surfaces, angle of reflected light, spectrum of reflected light, amount of specular and Lambertian reflectance, polarization (e.g., detection of which can be facilitated by projecting light from spill detector 112 at or substantially near Brewster's angle), light reflectance and/or emission patterns (e.g., reflectance and/or emission due to movement of spill 306 due to, for example, vibrations (e.g., caused by robot 100 or other environmental factors) and/or other perturbation(s) of the surface of spill 306), and other properties. For example, a fan, a speaker (e.g., a loud speaker), and/or any other source of perturbation may be used to create patterns (e.g., ripples) on the surface of the spill, which could then be detected by the thermal infrared imager or other optical detection devices, as described in this disclosure. Laser, LED, or other sources of light (e.g., visibile or invisible) may be used to make the said patterns more detectable, or to make the patterns stand out more relative to a dry floor surface.

In some cases, these reflectance and/or emission properties can be dependent on one another, such as, where the intensity of light reflected off the surfaces is a function of angle and polarization of light incidence to the surfaces. For example, spill 306 can have a first reflectance and/or emission property and surface 604 can have a second reflectance and/or emission property. Accordingly, spill detector 112 can detect spill 306 based at least in part on the detection of the first reflectance and/or emission property by the one or more light meters. The different reflectance and/or emission properties of different materials (e.g., of surface 604 and spill 306) can be stored in memory 302, wherein controller 304 can identify spill 306 based at least in part upon matching measured reflectance and/or properties to reflectance and/or emission properties stored in memory 302 and/or a difference between measured reflectance and/or emission properties in different spaces and/or different times. In some cases, at least detecting different reflectance and/or emission properties can prompt spill detector 112 to detect a spill 306 and/or alert a user using display 502 (illustrated in FIG. 5), wherein the user can view panel 506 and determine if spill 306 has been detected. In some cases, spill detector 112 can process the information from the one or more light meters along with any image(s) and/or information from other sensor. In some cases, spill detector 112 can prompt a user to get feedback (e.g., using display 502) and/or perform an action (e.g., a stop, alert help, or ignore) in response to detecting a spill 306 in response to at least finding a difference in reflectance and/or emission.

As another example, in some implementations, spill detector 112 can include a pad extending from robot 100, the pad can be in contact with the floor (e.g., surface 604). For example, the pad can extend distally from back side 124 and/or distally from any other side of robot 100. For example, where the pad extends distally from back side 124, it can more readily detect spills from robot 100. Where pad extends from front side 122 can allow robot 100 to detect spills in front of it. Having the pad beneath robot 100 can allow robot 100 to detect spills it passes over. The pad can be attached to a pole and/or any structure configured to position the pad in contact with the floor/surface. Robot 100 and/or spill detector 112 can use the resistance of the pad as it moves on the floor to take measurements indicative at least in part of the friction (and/or the coefficient of friction) and/or slip resistance between the pad and surface 604 and/or spill 306. In some cases, the coefficient of friction of surface 604 can be different than spill 306. For example, spill 306 can comprise liquids and/or other substances (e.g., water, aqueous solutions, honey, milk, mustard, ketchup, oil, bodily fluids, beverages, butter, ice, candy, cleaners (e.g., cleaning fluid, floor wax, disinfectants, etc.), grease, oil, industrial waste, coolant, and/or other chemicals) with lower coefficients of friction than the materials of surface 604 (e.g., wood (e.g., engineered, synthetic, hardwood, etc.), bamboo, vinyl, concrete, ceramic tile, linoleum, porcelain tile, laminate, cork, stone, aluminum, metals, steel, epoxy, and/or other materials). In some cases, in order to measure the friction experienced by the pad, a dynamometer can be used. In some cases, the dynamometer can be coupled to a motor of robot 100 (e.g., a motor of actuators unit 320, such as the motor used for the motorized propulsion that enables robot 100 to move from one place to another) to detect resistance of movement (e.g., as experienced in differences in torque, power, force, etc.). In some cases, dynamometer and/or other kinematic measurements (e.g., accelerometers, gyroscopes, etc.) can be coupled to the pad in order to detect increased resistance of movement (e.g., as experienced by moments, forces, etc.) on the pad. In some cases, in response to at least detecting changes in the friction experienced by the pad, spill detector 112 can detect a spill 306 and/or prompt spill detector 112 to alert a user using display 502, wherein the user can view panel 506 and determine if spill 306 has been detected. In some cases, spill detector 112 can process the information from the dynamometer along with any image(s) and/or information from other sensor. In some cases, spill detector 112 can prompt a user to get feedback (e.g., using display 502) and/or perform an action (e.g., a stop, alert help, or ignore) in response to detecting a spill 306 in response to at least finding a difference in friction.

As another example, spill detector 112 can include a fluorescence detector and/or imager. For example, there can be a fluorescent wax additive for the floor (e.g., surface 604). Some example additives are quinine, niacin, riboflavin, vitamins A and B, chlorophyll, bleach, fluorescent whitener additives, uranin, metal complex organic pigments, aromatic organic pigments, and/or other known fluorescent chemicals, such as pigments and/or dyes. Under a blacklight UV source (or other fluorescent-inducing conditions, such as laser-induced fluorescence, etc.), which can be attached to robot 100 or elsewhere in the environment such that the blacklight UV source shines on the floor (e.g., surface 604), spill 306 may attenuate or occlude the incident UV and/or the UV-induced floor fluorescence, which can be detected by potentially sharp boundary drops in the fluorescence detected by the fluorescence detector and/or imager. Accordingly, spill detector 112 can detect spill 306 based at least in part on the boundaries of data (e.g., an image) by a fluorescence detector and/or imager. As another illustration, where robot 100 is a floor cleaner (e.g., floor scrubber), the cleaning fluid of robot 100 can have a UV-induced fluorescence. This UV-induced fluorescence can be mitigated once the cleaning fluid dries. In this way, where spill 306 comprises such cleaning fluid, spill 306 can be imaged (e.g., using an RGB camera or other camera) and distinguishable from surface 604 under a black light UV source or other fluorescent-inducing conditions. In some cases, spill detector 112 can process images and detect the UV-induced fluorescence of spill 306, such as through machine vision algorithms including machine learning, image processing, segmentation, etc. In some cases, at least detecting the UV-induced fluorescence in some cases (or in some cases, the occlusion of UV-induced fluorescence) can prompt spill detector 112 to detect a spill 306 and/or alert a user using display 502, wherein the user can view panel 506 and determine if spill 306 has been detected. In some cases, spill detector 112 can process the information from the image(s) imaged under a black light UV source and/or other fluorescent-inducing conditions along with any other image(s) and/or information from other sensor. In some cases, spill detector 112 can prompt a user to get feedback (e.g., using display 502) and/or perform an action (e.g., a stop, alert help, or ignore) in response to detecting a spill 306 in response to at least detecting UV-induced fluorescence in an image taken under a black light UV source or other fluorescent-inducing conditions.

As another example, luminescent components (e.g., chemically luminescent) may be added to cleaning fluids, such as by mixing in with the detergent, water, and/or dispensed from a separate container and/or reservoir. Luminescence may be induced by chemical reaction between those components, contact with air, fluid agitation during cleaning action, friction, etc. Likewise, a chemical reaction or a physical change in a state of matter can be used to alter the temperature of the cleaning fluid to help with spill detection, separately and/or in combination with systems and methods described in this disclosure. For example, latent heat of solution or melting can be utilized to alter the temperature of the cleaning medium.

As another example, an additional absorbent material pad may be employed, wherein the capacitance or other properties of the pad would change as it absorbs spills. In some cases, the pad can extend from front side 122 and/or back side 124.

As another example, spill detector 112 can include a camera (e.g., photo camera, video camera, IR camera, etc.) that can image surface 604 and spill 306. Spill detector 112 can use the camera to detect a movement of spill 306 on surface 604. For example, spill 306 can expand and/or move due to surface 604 being unlevel and/or uneven, and/or due to properties of spill 306, such as adhesion, cohesion, etc. In some cases, the camera can take a plurality of images of surface 604 and spill 306. A differential between the images can be taken, which, in some cases, can produce a differential image. The differential image can be used to determine, at least in part, where (and if) changes have occurred in surface 604 and spill 306. If the changes indicate at least in part a movement, spill detector 112 can detect spill 306 based at least in part on that movement. In some cases, at least detecting the movement can prompt spill detector 112 to detect a spill 306 and/or alert a user using display 502, wherein the user can view panel 506 and determine if spill 306 has been detected. In some cases, spill detector 112 can process the detected movement along with any other information from other sensor. In some cases, spill detector 112 can prompt a user to get feedback (e.g., using display 502) and/or perform an action (e.g., a stop, alert help, or ignore) in response to detecting a spill 306 in response to at least detecting a movement.

As another example, spill detector 112 can measure electric properties of surface 604 and spill 306. By way of illustration, spill detector 112 can have a plurality of electrodes and/or leads. In some cases, the electrodes and/or leads can make contact with surface 604 and/or spill 306. For example, spill detector 112 can include a capacitance meter, voltmeter, multimeter (e.g., a Digital Multimeter ("DMM")), oscilloscope, ohmmeter, ammeter, etc. In some cases, surface 604 and spill 306 can have different electrical properties, where spill detector 112 can use, at least in part, the different electrical properties of surface 604 and spill 306 to detect spill 306. For example, in some cases where spill 306 is an aqueous solution, spill 306 can have greater conductivity, less impedance, and/or greater capacitance than floor 306 when surface 604 includes materials, such as wood (e.g., engineered, synthetic, hardwood, etc.), bamboo, vinyl, concrete, ceramic tile, linoleum, porcelain tile, laminate, cork, stone, epoxy, and other materials. In other cases, spill 306 can have less conductivity, more impedance, and/or less capacitance than surface 604 when surface 604 comprises, for example, certain metals. A person having ordinary skill in the art should appreciate that spill 306 and surface 604 can comprise various materials, each of which with different relative electrical properties. Based at least in part on the difference in electrical properties, spill detector 112 can detect spill 306. For example, controller 304 can receive electrical measurements from spill detector 112. Controller 304 can detect a difference in electrical properties, such as a difference in conductivity, impedance, and/or capacitance. In some cases, the electrical properties of surface 604 can be predetermined for controller 304, such as by programming and/or identification of the materials. Accordingly, based at least on the predetermined electrical properties of surface 604, a higher or lower measurement of electrical properties can be indicative of spill 306. In some implementations, at least any difference (e.g., higher in some circumstances, lower in some circumstances, or either higher or lower in some circumstances) of electrical properties detected can prompt controller 304 to alert a user and/or use other sensors of spill detector 112 to verify the presence of spill 306. In some cases, at least detecting a difference in electrical properties can prompt spill detector 112 to detect a spill 306 and/or alert a user using display 502, wherein the user can view panel 506 and determine if spill 306 has been detected. In some cases, spill detector 112 can process the detected electrical property difference along with any image(s) and/or other information from other sensor. In some cases, spill detector 112 can prompt a user to get feedback (e.g., using display 502) and/or perform an action (e.g., a stop, alert help, or ignore) in response to detecting a spill 306 in response to at least finding a difference in electrical properties.

In some implementations, spill detector 112 can include a microphone. The microphone can be configured to detect noises associated with a spill, such as the sound of broken glass, objects falling, people's reactions, etc. These noises associated with a spill can be stored in memory 302, wherein controller 304 can associate the noises with spill 306. In some cases, at least the detection of the noises can prompt spill detector 112 to detect a spill 306 and/or alert a user using display 502, wherein the user can view panel 506 and determine if spill 306 has been detected. In some cases, spill detector 112 can process detected noises along with any image(s) and/or other information from other sensor. In some cases, spill detector 112 can prompt a user to get feedback (e.g., using display 502) and/or perform an action (e.g., a stop, alert help, or ignore) in response to detecting a spill 306 in response to at least detecting the noises.

In some cases, spills can be associated with colors. For example, certain cleaning products and/or other chemicals can have an associated color or be dyed a color. Where there is a spill 306, the color of that cleaning product and/or other chemical can be more readily viewable than if the cleaning products and/or other chemicals are spread out, such as by cleaning and drying. A camera (e.g., an RGB camera) of spill detector 112 can be used to image spill 306 and surface 604. Based at least on the colors, spill detector 112 can segment the image and/or detect/identify spill 306. In some cases, based at least upon the detection/identification of spill 306 from the images, spill detector 112 can alert a user using display 502, wherein the user can view panel 506 and determine if spill 306 has been detected. In some cases, spill detector 112 can process these images along with any other image(s) and/or other information from other sensor. In some cases, spill detector 112 can prompt a user to get feedback (e.g., using display 502) and/or perform an action (e.g., a stop, alert help, or ignore) in response to detecting a spill 306 in response to at least detecting the noises.

In some implementations, location can be used to further inform measurements taken by spill detector 112. For example, where spill detector 112 is attached to robot 100, robot 100 can have a mapping and localizing unit that allows robot 100 to determine its location in an environment. As another example, where spill detector 112 is stationary, it can associate the location spill detector 112 with characteristics.

In some implementations, spill detector 112 can then learn to associate readings (e.g., images taken by cameras and/or any other information of any other sensor of spill detector 112) with locations in the environment. For example, in a store environment, some areas can be colder due to refrigeration, air conditioning vents, and/or other store features. Some areas can also be warmer due to heating vents, heat exchanges, and/or other store features. In some implementations, spill detector 112 can learn to associate certain temperature readings with certain locations in an environment. For example, these temperature readings associated with certain locations can facilitate calibration of IR cameras and/or any other sensor of spill detector 112. Moreover, if the temperature of the floor (e.g., surface 604) is known, spill detector 112 can identify differences from that temperature as areas of potential spills 306.

In some implementations, through a plurality of iterations where spill detector 112 detects a potential spill and alerts a user using display 502, the user can provide feedback regarding the spill detection (e.g., with regard to the veracity or legitimacy of the detection). In some cases, where the user selects an action such as option 512, which ignores the spill, spill detector 112 can learn to associate images taken at particular locations (e.g., as determined by a mapping and localizing unit of robot 100) with false positives. Accordingly, for example, spill detector 112 can recalibrate the cameras (e.g., IR camera) and/or other sensors in those locations and/or increase predetermined thresholds to decrease the number of false positives. For example, the predetermined number threshold and/or the predetermined percentage threshold discussed with reference to at least portion 1106 of FIG. 11 can be adjusted. As another example, the other sensors of spill detector 112 can also be recalibrated to decrease false positives.

In some cases, spill detector 112 can learn to associate certain areas as having an increased likelihood of spills. For example, through a plurality of iterations, spill detector 112 can detect a potential spill and receive confirmation (e.g., an acknowledgment or any action such as actions associated at least in part with options 508, 510) that a spill has been detected. If the detected spills frequently appear in a particular area (e.g., as determined by the mapping and localizing unit of robot 100), spill detector 112 can more readily identify potential as spills, such as by recalibrating a camera (e.g., an IR camera) in those locations and/or decreasing predetermined thresholds (e.g., the predetermined number threshold and/or the predetermined percentage threshold discussed with reference to at least portion 1106 of FIG. 11). As another example, the other sensors of spill detector 112 can also be recalibrated in order to more readily detect spills (e.g., spill 306) in these areas. Advantageously, using locations can further enhance the robustness and capabilities of spill detector 112's ability to detect spills and reduce false positives.

IV. Methods

Figure 11:
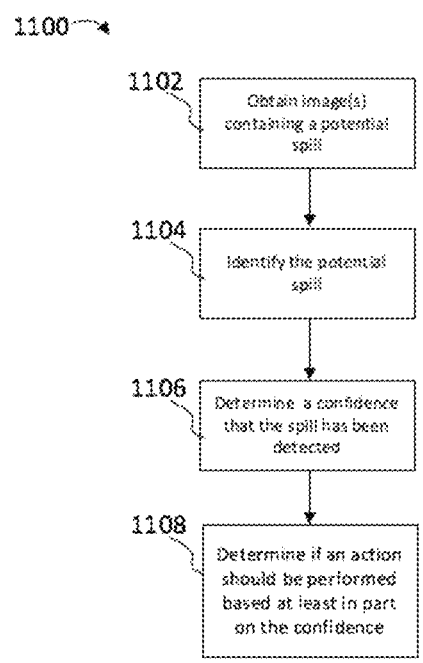
FIG. 11 is a process flow diagram of an exemplary method for detecting a spill in accordance with some implementations of the present disclosure.

FIG. 11 illustrates a process flow diagram of an example method for detecting a spill 306. Portion 1102 can include obtaining image(s) of a scene containing a potential spill. An example image can be an image of at least a portion of field of view 604. For example, these image(s) can include thermal images, such as the thermal images discussed with reference to the "II. Thermal imaging to detect spills" section of this disclosure, as well as elsewhere throughout this disclosure. The distinction between spill 306 and surface 604 in those thermal images can be enhanced by one or more of the systems and methods described in that section such as by using temperature adjuster 116. Any other image described in this disclosure can also be used as well.

Additional sensors can also be used in addition to or in the alternative to the images. For example, any of the sensors discussed in the "III. Other sensors to detect spills" section of this disclosure, as well as well as elsewhere throughout this disclosure, can also be used as additional sensors.

In some cases, spill detector 112 can remove noise from image(s) obtained in portion 1102. In some cases, infrared cameras can be noisy, which can impair the ability of spill detector 112 to image and/or detect spill 306. Accordingly, filters can be applied to the image(s) in order to remove noise. These filters can filter full field and/or specular components of images (e.g., thermal images). In some cases, a low pass filter can be used to filter out ambient noise. In some cases, high pass filters can be used to remove aliasing and/or other noise. In some cases, a bandpass filter and/or a combination of high pass filters and low pass filters can be used to retain the informative spectrum of the images. In some cases, these filters can be applied in multiple stages. For example, in some cases with thermal images, the bandpass can be approximately wavelengths 2.7-5.3 µm, 8-12 µm, and/or any other wavelengths determined based at least in part on infrared camera calibration, the expected temperatures of spill 306, the expected temperature of surface 604, the expected temperature of the environment/scene, predetermined environmental/scenic noise, the range of temperatures in the environment/scene etc. Other noise-reducing signal processing can be used, such as removing outliers, correlation, averaging, etc.

In some cases, other environmental/scenic noise can impair the quality of the image(s) obtained in portion 1102. For example, heat signals from the robot 100 itself can problematically skew images and/or decrease the resolution of images. To fix this issue, in some cases, a hood and/or a thermal shield can be used on the body of robot 100 to reduce robot's 100 appearance in images. In some cases, images can also be cropped to remove the appearance of robot 100. False positives can also be increased by other factors, such as lighting, vents, etc. A hood can be placed over spill detector 112 to reduce that noise.

Portion 1104 includes identifying the potential spill (e.g., spill 306). In some implementations, spill detector 112 can be configured to perform segmentation on image(s) obtained from portion 1102. There are many known image segmentation techniques known in the art, and this disclosure is not limited to any particular set of them. For example, such segmentation can include thresholding, water shed techniques, clustering, neural networks, K-means, region-growing, edge detection, etc. By way of illustration, adaptive thresholding can segment the image(s) taken from portion 1102. Advantageously, segmentation can allow spill detector 112 to determine which portions of an image belong to, for example, spill 306 or surface 604. The images, after and/or before segmentation, can also be further cleaned up with morphological image processing (e.g., erosion and dilation to remove noise), filters, etc.

As discussed in the "II. Thermal imaging to detect spills" section, where thermal images are used, the distinction between spill 306 and surface 604 can be resolvable. As discussed, this distinction can be further enhanced in images over time and/or with the use of temperature adjuster 116. These distinctions can further enable effective segmentation, such as by enhancing the edges and/or boundaries of spill 306, making those edges more easily detected by edge detection methods and/or other segmentation. These distinctions can also cause the temperature difference between spill 306 and surface 604 to be greater. As a result, they appear as more dissimilar luminance values, chrominance, and/or colors in an image (e.g., thermal image), allowing for thresholding and/or other segmentation techniques to be more effective due to the ability to choose thresholds that can separate spill 306 and surface 604. In this way, discussed systems and methods in the "II. Thermal imaging to detect spills" section can reduce false positives and enable spill detector 112 to better segment and image and/or identify spill 306.

In some implementations, a vision classifier can be used on the image(s) obtained in portion 1102 to identify the potential spills. In some cases, the vision classifier can utilize learning-based methods to identify spills from image(s) obtained in portion 1102. By way of illustrative example, library 324 can comprise example images of spills, such as example thermal images, RGB camera images, etc., of spills. Library 324 can then be used in a supervised or unsupervised machine learning algorithm for controller 304 to learn to identify/associate patterns in images with spills. The images of library 324 can be identified (e.g., labelled by a user (e.g., hand-labelled) or automatically, such as with a computer program that is configured to generate/simulate library images of spills and/or label those library images). In some implementations, library 324 can also include images of spills in different lighting conditions, angles, sizes (e.g., distances), clarity (e.g., blurred, obstructed/occluded, partially off frame, etc.), colors, temperatures, surroundings, etc. From these images, controller 304 can first be trained to identify the spills. Spill detector 112 can then use that training to identify spills in image(s) obtained in portion 1102.

For example, in some implementations, controller 304 can be trained from library 324 to identify patterns in library images and associate those patterns to spills. When an image obtained in portion 1102 has the patterns that controller 304 identified and associated to spills, controller 304 can determine that the image obtained in portion 1102 contains a spill and/or the location of the spill in the image obtained in portion 1102. In some implementations, controller 304 can process each image obtained in portion 1102 and compare that image to one or more images in library 324 (e.g., a library image). In some cases, where an image obtained in portion 1102 substantially matches an image or plurality of images in library 324, controller 304 can identify the image obtained in portion 1102 as containing a spill (e.g., spill 306) and/or the location of the spill in that image.

Portion 1106 includes determining a confidence that the spill has been detected. In some implementations, the confidence can be calculated using, at least in part, Bayesian and/or other statistical methods. In some implementations, the confidence can be determined by the number of times a spill is identified in the images obtained in portion 1102. For example, the images obtained in portion 1102 can comprise a plurality of images taken in succession. For example, spill detector 112 can take images in sub-second intervals. In some cases, these images can form a video, wherein a camera of spill detector 112 takes images forming substantially a video, such as a video having 24 or more frames per second. When spill detector 112 is stationary, spill detector 112 may take many images of a substantially similar position, allowing spill detector 112 to image a potential spill over a period of time. When spill detector 112 is mobile, such as attached to a mobile robot 100, spill detector 112 may image a potential spill for a period of time as it moves, wherein the potential spill eventually moves off frame. In either case, there can be a plurality of images of a potential spill obtained in portion 1102.

In some implementations, there can be a predetermined number threshold wherein if equal to or more than the predetermined number threshold of images obtained in portion 1102 are identified as having spill 306, spill detector 112 determines that there is a spill with high confidence. For example, the predetermined number threshold can be a number (e.g., 1, 2, 3, 4, 5, 6, or more) wherein the predetermined number threshold can be determined from at least one or more of the speed at which spill detector 112 (and/or robot 100) is moving, the size of field of view 602 of spill detector 112, the time in which a potential spill may be within field of view 602, whether temperature adjuster 116 is in use, characteristics of temperature adjuster 116 to create differentiation between spill 306 and surface 604, the number of images taken per second, the kind of images taken (e.g., thermal, RGB, etc.), a percentage of the number of images taken per second, and/or other characteristics of spill detector 112, potential spill 306, and/or surface 604. In some cases, the predetermined number threshold can be based at least in part on images in a predetermined time interval (e.g., 1, 2, 3,4 or more seconds). The predetermined number threshold can be determined based at least in part on the number of images taken per second, the kind of images taken (e.g., thermal, RGB, etc.), a percentage of the number of images taken per second, and/or other characteristics of spill detector 112, potential spill 306, and/or surface 604. In some cases, instead of, or in addition to, a predetermined number threshold, a relative measurement, such as a predetermined percentage threshold can be used, wherein when the percentage of images in the predetermined time interval is equal to or greater than the predetermined percentage threshold, spill detector 112 determines that there is a high probability a spill has been detected.

Where spill detector 112 detects spills in some images obtained in portion 1102, but the number and/or percentage of images does not exceed the predetermined number threshold and/or the predetermined percentage threshold, spill detector 112 does not detect a spill with high confidence. In some cases, when robot does not detect a spill with high confidence, it is said to detect a spill with low confidence. Other similar thresholds can be used to stratify detection, such as predetermined number thresholds and predetermined percentage thresholds set to identify medium confidence, medium-to-low confidence, medium-to-high confidence, very high confidence, and/or any other categorization indicative at least in part of confidence.

In some implementations, additional sensors can be used to further inform spill detectors confidence. For example, any sensor discussed in the "III. Other sensors to detect spills" section of this disclosure, as well as well as elsewhere throughout this disclosure, can provide additional information. In some implementations, if spill detector 112 does not determine with high confidence (e.g., determines with low confidence) a spill has been detected based at least in part on the images obtained in portion 1102, spill detector 112 can determine with high confidence a spill has been detected if one or more of these additional sensors have information indicative at least in part of a spill. In some cases, where spill detector 112 detects a spill with high confidence based at least in part on images obtained from portion 1102, that confidence may be reduced to low confidence (or another confidence) if the additional sensors do not detect a spill. However, in some implementations, even if the additional sensors do not detect a spill, spill detector 112 can determine with high confidence that a spill has been detected if the number and/or percentage of images obtained from portion 1102 exceeds the predetermined number threshold and/or the predetermined percentage threshold.

Portion 1108 includes determining if an action should be performed based at least in part on the confidence. In some implementations, if a low confidence or a high confidence was determined in portion 1106, spill detector 112 can alert a user using display 502 (described in FIG. 5), wherein the user can view panel 506 and determine if spill 306 has been detected. The user can then use display 502 to perform an action, such as an action associated at least in part with one or more of options 508, 510, 512. Advantageously, in cases of low confidence, this additional feedback can allow spill detector 112 to determine that a spill has been detected and perform actions according to user instruction. In cases where there is high confidence, a user can then choose the appropriate actions.

In some implementations, spill detector 112 (and/or robot 100) may automatically perform an action, such as one or more actions associated with options 508, 510, 512. In some cases, spill detector 112 can send a signal to robot 100 indicative at least in part of the action. In response to the signal, robot 100 may then actuate one or more of actuators 320. In some cases, through repeated selection by a user, robot 100 can learn to associate detected spills (e.g., based at least in part on the confidence of portion 1106, patterns in images obtained in portion 1102, and/or user inputs) with performed actions. In this way, spill detector 112 can then perform those actions with little to no user input. The user's input can also inform the other portions 1102, 1104, 1106. For example, where a user selects option 512 to ignore a detected spill, through successive iterations, spill detector 112 can associate the patterns of images from portion 1102 and/or information from other sensors with being an ignored spill and/or false positive. Accordingly, spill detector 112 may no longer detect such patterns as being associated with spills.

Figure 12:
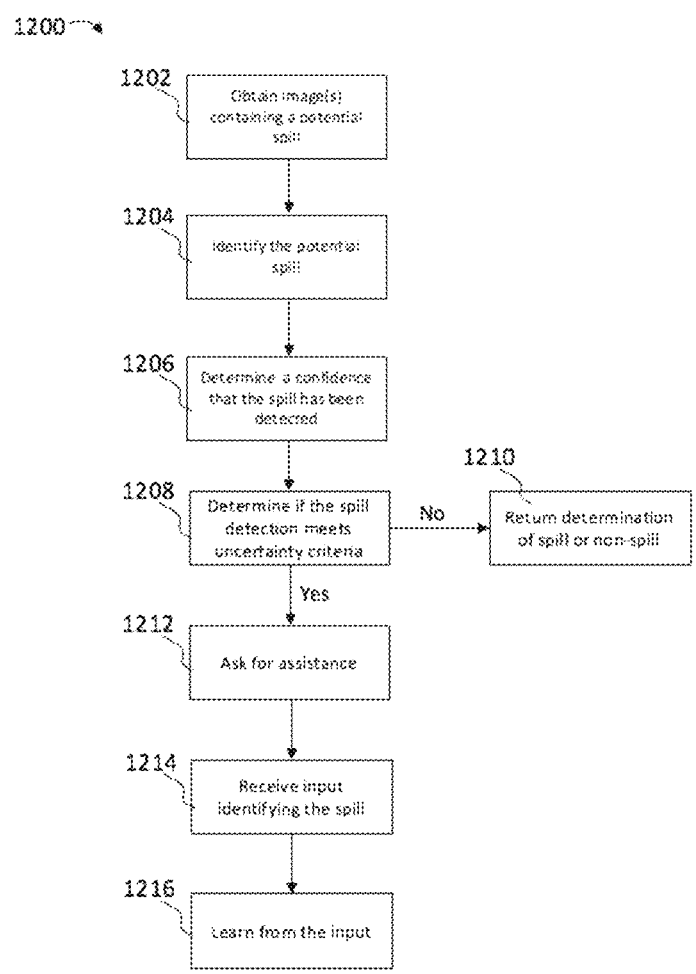
FIG. 12 is a process flow diagram of an exemplary method for detecting a spill where a robot can ask for user assistance in identifying the spill in accordance with some implementations of the present disclosure.

FIG. 12 illustrates a process flow diagram of an example method for detecting a spill 306 where robot 100 can ask for user assistance in identifying a spill. In method 1200, portions 1202, 1204, 1206 can be substantially similar to portions 1102, 1104, 1106 illustrated in FIG. 11, respectively.

Portion 1208 can include determining if the spill detection meets uncertainty criteria. For example, a low confidence can cause the spill detection to meet the uncertainty criteria, wherein spill detector 112 cannot determine the presence or absence of a spill sufficiently (e.g., without substantial risk of false positives or false negatives). In some implementations a confidence threshold can be used, wherein if the confidence is below the confidence threshold, spill detector 112 can determine that the uncertainty criteria has been met. The confidence threshold can be determined at least in part on empirical data on false positives and false negatives, the resolution of sensors of spill detector 112, the number of detection methods (e.g., how many of the spill detection methods described in this disclosure are used), and/or any other criteria. If the spill detection does not meet the uncertainty criteria (e.g., spill detector 112 was sufficiently confident in the detection), in portion 1210, spill detector 112 can return the determination of a spill or non-spill.

Portion 1212 can include asking for assistance. Spill detector 112 can ask for assistance via user interface 318, server 400, and/or any other medium. Asking for assistance can include sending a communication, such as a message, alert, etc.

Portion 1214 can include receiving input identifying the spill. The input can be user input that is inputted via user interface 318, server 400, and/or any other medium. The user input can include identification of a spill, the location of a spill, and/or any other information inputted by the user.

Portion 1216 can include learning from the input in portion 1214. For example, the user input can provide another labeled example for spill detector 112 and/or robot 100 to input into library 324 and/or use with machine learning. The labeled example can then be used to identify whether a spill is present in other cases like it, such as by comparing that labeled example to captured data and/or using learning algorithms to associate patterns in the labeled example with captured data.

Figure 13:
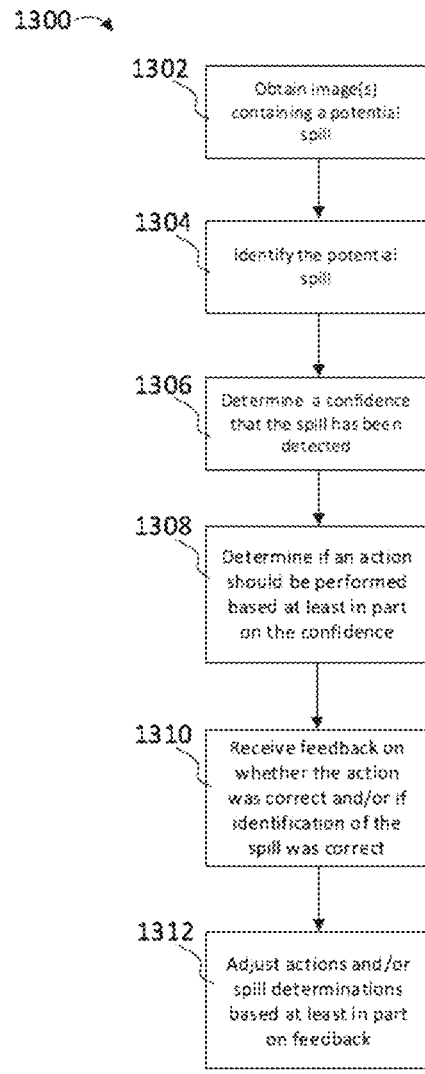
FIG. 13 is a process flow diagram of an exemplary method for detecting a spill where a robot can adjust behaviors based on feedback in accordance with some implementations of the present disclosure.

FIG. 13 illustrates a process flow diagram of an example method for detecting a spill 306 where robot 100 can adjust behaviors based on feedback. In method 1300, portions 1302, 1304, 1306, 1308 can be substantially similar to portions 1102, 1104, 1106, 1108 illustrated in FIG. 11, respectively.

Portion 1310 can include receiving feedback on whether the action (e.g., the action determined in portion 1308) was correct and/or if identification of the spill (e.g., the determination from portion 1304) was correct. The feedback can be inputted via user interface 318, server 400, and/or any other medium. The feedback can include identification of a spill, the location of a spill, confirmation/rejection of spill detection, confirmation/rejection of actions, and/or any other information inputted by the user.

Portion 1312 can include adjusting actions and/or spill determinations based at least in part on feedback received in portion 1310. For example, through repeated selection by a user, robot 100 can learn to associate detected spills (e.g., based at least in part on the confidence of portion 1306, patterns in images obtained in portion 1302, and/or user inputs) with performed actions. In this way, spill detector 112 can then perform those actions with little to no user input. The user's input can also inform the other portions 1302, 1304, 1306. For example, where a user selects option 512 to ignore a detected spill, through successive iterations, spill detector 112 can associate the patterns of images from portion 1302 and/or information from other sensors with being an ignored spill and/or false positive. Accordingly, spill detector 112 may no longer detect such patterns as being associated with spills.

Figure 14:
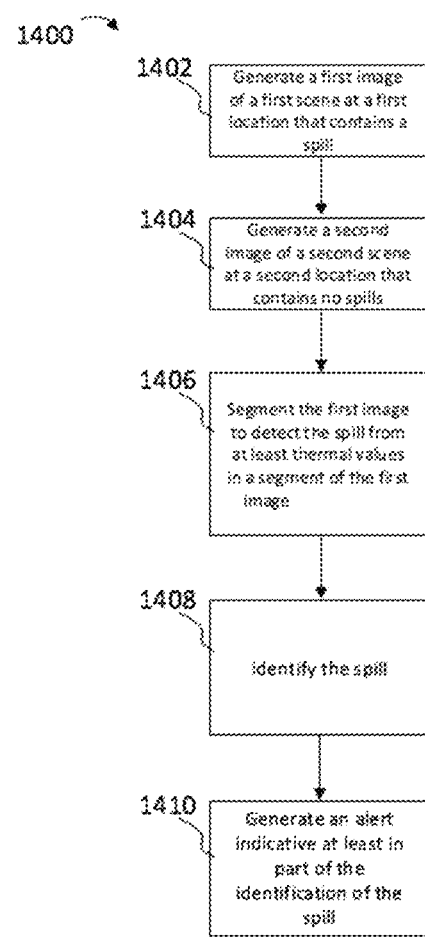
FIG. 14 is a process flow diagram of an exemplary method for detecting spills in accordance with principles of the present disclosure.

FIG. 14 illustrates a process flow diagram of an exemplary method for detecting spills in accordance with principles of the present disclosure. In method 1400, portion 1402 can include generating a first image of a first scene at a first location that contains a spill. Portion 1404 can include generating a second image of a second scene at a second location that contains no spill. Portion 1406 can include segmenting the first image to detect the spill from at least thermal values in a segment of the first image. Portion 1408 can include identifying the spill. Portion 1410 can include generating an alert indicative at least in part of the identification of the spill.

As used herein, computer and/or computing device can include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

As used herein, computer program and/or software can include any sequence or human or machine cognizable steps which perform a function. Such computer program and/or software may be rendered in any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., BREW), and the like.

As used herein, connection, link, transmission channel, delay line, and/or wireless can include a causal link between any two or more entities (whether physical or logical/virtual), which enables information exchange between the entities.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term 'includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value. Also, as used herein "defined" or "determined" can include "predefined" or "predetermined" and/or otherwise determined values, conditions, thresholds, measurements, and the like.

What is claimed is:

1. A robot, comprising:
   an actuator configured to move the robot between a plurality of locations;
   a spill detector comprising at least one optical imaging device configured to capture a plurality of images of a scene comprising a spill while the robot is either stationary or traveling between the plurality of locations; and
   a processor configured to execute computer readable instructions to,
      identify the spill in at least a respective number of images of the plurality of images if the respective number of images are equal to or more than a predetermined number threshold of images of the scene, and
      receive an action command based at least in part on an identification of the spill and a confidence measure associated with the identification of the spill, the confidence measure being calculated by statistical method.

2. The robot of claim 1, wherein the at least one optical imaging device comprises an infrared camera and at least one image of a plurality of images comprises a thermal image.

3. The robot of claim 1, further comprising a temperature adjuster configured to change a temperature value of the scene containing the spill.

4. The robot of claim 3, wherein the temperature adjuster comprises at least one of an exhaust and a fan.

5. The robot of claim 1, wherein the robot further comprises a sensor configured to detect at least one of reflectance properties, temperature, emission properties, electrical properties, noises, and friction of the scene.

6. The robot of claim 5, wherein the confidence measure is based at least in part on information from both the sensor and the respective number of images.

7. The robot of claim 1, wherein the processor is further configured to generate a color image having a plurality of colors based at least in part on a plurality of thermal values of a segment of at least one image, the plurality of colors are indicative at least in part of the spill.

8. The robot of claim 7, wherein the robot further comprises a floor cleaning system.

9. The robot of claim 8, wherein the action command corresponds to at least one of turning off the floor cleaning system, ignoring the detected spill, activating the actuator, or sending an alert to a user.

10. The robot of claim 1, wherein the processor is further configured to utilize a learning-based visual classification on a library of spill images, and identify the spill in the respective number of images based at least in part on the learning-based visual classification.

11. The robot of claim 1, wherein the confidence measure corresponds to number of times the spill is identified in the plurality of images, the plurality of images are captured in succession.

12. A method for detecting a spill, comprising:
generating a spill a plurality of images while a robot is either stationary or traveling between a plurality of locations;
identifying a spill in a respective number of images of the plurality of images if the respective number of images are equal to or more than a predetermined number threshold of images of the scene;
receive an action command based on recognition of the spill in the respective number of images and a confidence measure associated with the identification of the spill, the confidence measure being calculated by statistical method; and
generating an alert indicative at least in part of the identification of the spill.

13. The method of claim 12, further comprising adjusting a temperature value of a first scene in an environment traveled by the robot while generating a first image of the plurality of images.

14. The method of claim 12, wherein the generating of the alert is corresponds to the confidence measure.

15. The method of claim 12, further comprising:
detecting at least one of reflectance properties, emission properties, temperature, electrical properties, noises, and friction in an environment traveled by the robot.

16. The method of claim 12, wherein the confidence measure corresponds to number of times the spill is identified in the plurality of images, the plurality of images are captured in succession.

* * * * *